(12) United States Patent
Galdi et al.

(10) Patent No.: US 12,515,384 B2
(45) Date of Patent: Jan. 6, 2026

(54) APPARATUS AND METHOD FOR PRODUCING OBJECTS IN CONTINUOUS CYCLE FROM PLASTIC MATERIAL

(71) Applicant: SACMI COOPERATIVA MECCANICI IMOLA SOCIETA' COOPERATIVA, Imola (IT)

(72) Inventors: Antonio Galdi, Mordana (IT); Mattia Mordini, Imola (IT); Andrea Sallioni, Molinella (IT); Marcello Zama, Faenza (IT)

(73) Assignee: SACMI COOPERATIVA MECCANICI IMOLA SOCIETA' COOPERATIVA, Imola (IT)

( * ) Notice: Subject to any disclaimer, the term of this patent is extended or adjusted under 35 U.S.C. 154(b) by 158 days.

(21) Appl. No.: 18/323,441

(22) Filed: May 25, 2023

(65) Prior Publication Data

US 2023/0390974 A1 Dec. 7, 2023

(30) Foreign Application Priority Data

Jun. 7, 2022 (IT) .................. 102022000011978

(51) Int. Cl.
*B29C 43/58* (2006.01)
*B29C 43/02* (2006.01)
*B29C 43/34* (2006.01)

(52) U.S. Cl.
CPC .............. *B29C 43/58* (2013.01); *B29C 43/02* (2013.01); *B29C 43/34* (2013.01)

(58) Field of Classification Search
CPC ......... B29C 43/58; B29C 43/02; B29C 43/34; B29C 31/04; B29B 11/12
See application file for complete search history.

(56) References Cited

U.S. PATENT DOCUMENTS 3,692,456 A * 9/1972 Foster .................. B29C 45/561
425/412
5,858,420 A 1/1999 Szajak et al.
(Continued)

FOREIGN PATENT DOCUMENTS

IT 102021000032507 12/2021
JP H06114867 4/1994
(Continued)

OTHER PUBLICATIONS

Italian Search Report and Written Opinion for related application No. IT 102022000011978, completed Feb. 2, 2023, 11 pages.

*Primary Examiner* — Alison L Hindenlang
*Assistant Examiner* — Shibin Liang
(74) *Attorney, Agent, or Firm* — Chrisman Gallo Tochtrop LLC

(57) ABSTRACT

Apparatus for producing objects in continuous cycle from plastic material includes: distributor unit; forming station for forming a plurality of objects by compression moulding; metering unit, including an outlet valve system and an additional valve system, where the outlet valve system and the additional system are each switchable between an open configuration and a closed configuration; and plurality of partition elements, disposed between the additional system and the outlet valve system and movable between an upper limit position and a lower limit position to vary an internal volume of the distributor unit, where, in a charging configuration of the metering unit, the outlet valve system and the additional valve system are in the closed configuration and in the open configuration, respectively, and in a discharging configuration of the metering unit, the additional system and the outlet valve system are in the closed configuration and in the open configuration, respectively.

11 Claims, 14 Drawing Sheets

(56) References Cited

U.S. PATENT DOCUMENTS

| | | | |
|---|---|---|---|
| 7,476,094 B2 * | 1/2009 | Hanot | B29C 31/048 |
| | | | 425/465 |
| 2003/0066180 A1 * | 4/2003 | Bassi | B29C 43/146 |
| | | | 29/430 |
| 2011/0280981 A1 * | 11/2011 | Parrinello | B29C 43/34 |
| | | | 425/348 R |
| 2013/0115325 A1 | 5/2013 | Zoppas et al. | |
| 2021/0237320 A1 * | 8/2021 | Fazziani | B29C 43/58 |

FOREIGN PATENT DOCUMENTS

| | | |
|---|---|---|
| JP | 2017177455 A | 10/2017 |
| KR | 20080005731 U | 1/2008 |
| WO | 2022064373 | 3/2022 |

* cited by examiner

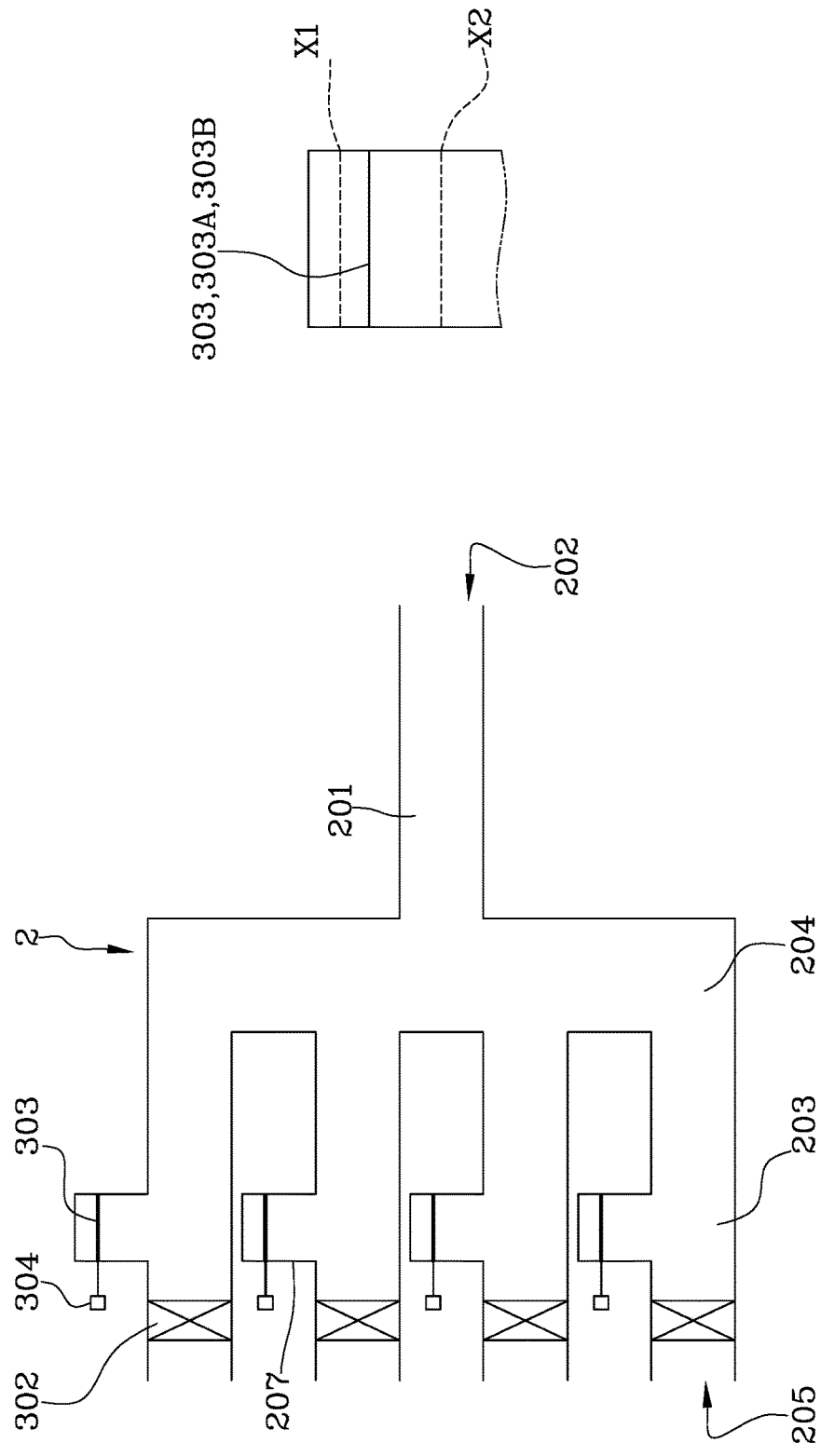

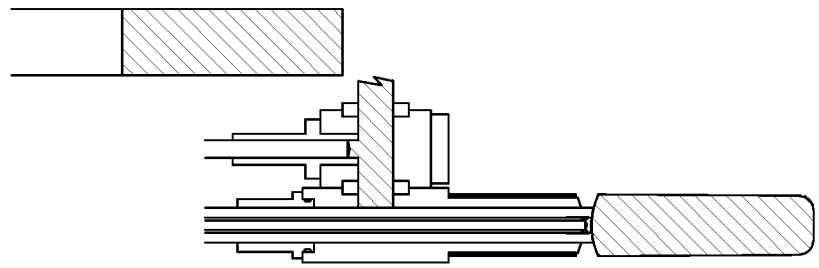
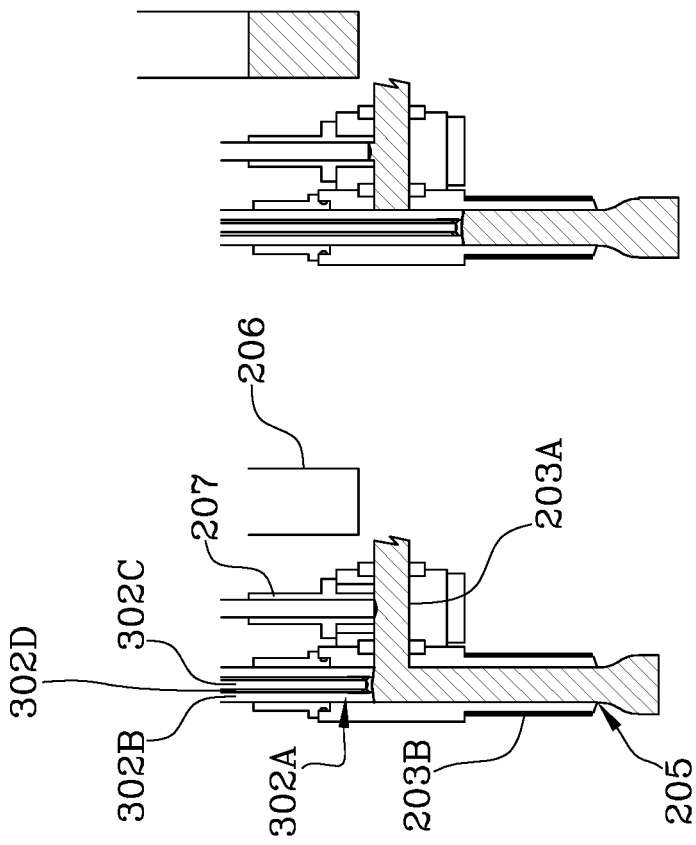
Fig.5E   Fig.5F   Fig.5G

APPARATUS AND METHOD FOR PRODUCING OBJECTS IN CONTINUOUS CYCLE FROM PLASTIC MATERIAL

FIELD OF THE INVENTION

This invention relates to an apparatus and a method for producing objects in continuous cycle from plastic material.

BACKGROUND OF THE INVENTION

This disclosure addresses the sector of moulding objects from thermoplastic material. More specifically, the sector is that of moulding a plurality of objects simultaneously from plastic material. In an example embodiment, the objects are parisons intended for subsequent blow moulding to form containers.

Known in the prior art for this purpose are apparatuses in which a metering unit is configured to form a plurality of measured doses of plastic from a flow of molten plastic. An example of this type of apparatus is described in JP2017177455A, where rotary elements are configured to rotate as one to divide the flow of molten plastic into a plurality of identical doses. An apparatus of this kind, however, does not allow making the doses precisely or adjusting the quantity of plastic of one dose independently of the quantity of the other doses. In this regard, there are apparatuses known in the prior art which comprise a system for measuring and adjusting the quantity of material in order to adjust the quantity of plastic in each dose, as described, for example, in JPH06114867A; this document describes a plastic distributor comprising outlet ports, each provided with a weighing and injecting unit configured to measure and adjust the quantity of material forming the dose. The document does not, however, describe in sufficient depth the way in which the material is measured and adjusted to form the doses.

Patent document U.S. Pat. No. 5,858,420 describes a solution regarding an injection moulding system in which the continuous flow of plastic is divided and distributed and in which the injected plastic is measured by a volumetric system.

BRIEF SUMMARY OF THE INVENTION

This disclosure has for an aim to provide an apparatus and a method for producing objects in continuous cycle from thermoplastic material to overcome the above mentioned disadvantages of the prior art.

More specifically, the aim of this invention is to provide an apparatus and a method for producing objects in continuous cycle from plastic material and capable of dividing the material uniformly into a plurality of doses starting from a continuous flow of plastic.

Another aim of this invention is to propose an apparatus and a method for producing objects in continuous cycle from plastic material to allow adjusting the quantity of plastic of one dose independently of the other doses.

Yet another aim of this disclosure is to provide an apparatus and a method for producing objects in continuous cycle from plastic material where it is possible to obtain a plurality of doses whose volume is known with precision. These aims are fully achieved by the apparatus and method of this disclosure for producing objects in continuous cycle from plastic material as characterized in the appended claims.

This disclosure relates to an apparatus for producing objects in continuous cycle from plastic material. The plastic material may be, for example, HDPE, PET or PP.

The HDPE plastic material may have a melt index (or melt flow index) (at 190°, 2.16 Kg, ASTM D1238) of between 0.2 and 3 g/10 min. The HDPE plastic material may have a density of between 0.940 and 0.970 g/cm$^3$. The HDPE plastic material may have a unimodal or bimodal molecular weight distribution. The HDPE plastic material may include a nucleating agent (for example, a macromolecule that is more linear compared to chrome-catalysed processes and that does not have branches with Ziegler-Natta or metallocene catalysts). The HDPE plastic material may include an additive to increase the oxygen and/or moisture barrier property by 20% to 50%. The PET plastic material may have an intrinsic viscosity of between 0.72 and 1.10 dl/g (ASTM D4603-03). The PP plastic material may have a melt index (at 230° C., 2.16 Kg, ISO 1133) of between 0.5 and 4 g/10 min. The PP plastic material may have a flexural modulus of between 850 and 2000 MPa. The PP material may be a homopolymer, or a random copolymer or a block copolymer.

The apparatus comprises a distributor unit. The distributor unit is configured to distribute plastic in the apparatus, or in parts of the apparatus. The distributor unit comprises an infeed duct, having an inlet. The inlet may be configured to receive a continuous flow of molten plastic, for example, from an extruder unit. The extruder unit may be configured to receive plastic in raw form and feed out a flow of molten plastic. An outlet of the extruder unit may be located at the infeed duct of the metering unit. For example, the flow of molten plastic received by the infeed duct (that is, by the inlet of the infeed duct) may be pressurized. In an example, the distributor unit includes a plurality of outfeed branches. The plurality of outfeed branches, or rather, each outfeed branch of the plurality of outfeed branches, is in fluid communication with the infeed duct, for example, through a distribution zone. The distribution zone is preferably configured to put the inlet, that is, the infeed duct, in communication with each outfeed branch so as to allow the plastic to be fed towards and distributed, that is, divided between, the outfeed branches. In other words, the distribution zone is configured to divide the flow of plastic into a plurality of (separate) flows of plastic.

Each outfeed branch of the plurality of outfeed branches preferably has an outlet, thus defining a corresponding plurality of outlets. The distributor unit defines an internal volume between the inlet, that is, between the infeed duct, and the outlets, that is, the plurality of outfeed branches.

The distribution zone may be a single distribution zone or it may comprise a plurality of distribution zones. In an example, the plurality of distribution zones comprises a first distribution zone and a second distribution zone. The first distribution zone, located downstream of the infeed duct in the direction of feed of the plastic from the inlet to the outlets, may be configured to divide the flow of plastic into a plurality of (separate) flows of plastic, and the second distribution zone, located downstream of the first distribution zone, may be configured to receive the plurality of separate flows of plastic and to separate them further. In this example, the first and the second distribution zone constitute a first and a second branch for the incoming continuous flow of plastic towards the infeed duct.

The apparatus comprises a forming station. The forming station may be an injection moulding station, or an injection compression moulding station or, more preferably, a compression moulding station. The forming station is configured to form a plurality of plastic objects from a plurality of predetermined quantities of plastic, that is, of doses. The forming station includes a plurality of female elements, that is, a plurality of lower moulds, and a plurality of male elements, that is, a plurality of upper moulds. Preferably, the female elements of the plurality of female elements can be positioned at the plurality of outfeed branches of the distributor unit, that is to say, each female element can be positioned at a respective outfeed branch. Thus, each female element is configured to receive plastic from the outlet of the respective outfeed branch. Preferably, the female elements of the plurality of female elements define a corresponding plurality of seats, each seat being configured to receive a predetermined quantity of plastic, that is to say, a dose.

Preferably, each of the plurality of seats comprises a receiving diameter and the diameter of a dose of the plurality of doses is smaller than the receiving diameter of each of the plurality of seats. Preferably, the receiving diameter of a seat is proportional to the geometry of the plastic object and/or depends on the properties of the polymer of the plastic material (HDPE, PP, or PET). In an example, the difference between the receiving diameter of a seat and the diameter of a dose is between 1 mm and 10 mm. Preferably, each of the plurality of seats comprises a receiving height and the height of a dose is less than or equal to the receiving height of the respective seat. The male elements of the plurality of male elements are configured to act in conjunction with the respective female elements of the plurality of female elements to delimit a corresponding plurality of forming cavities. The male elements of the plurality of male elements preferably act in conjunction with the respective female elements of the plurality of female elements to form a plurality of objects from plastic material by compression moulding. In an example, the objects are parisons intended for blow moulding to form containers.

If the objects are parisons and the plastic material is HDPE, the parison may have an axial stretch of between 1 and 1.5, preferably between 1 and 1.3, the axial stretch being equal to the ratio between a height of a container and a height of the parison; the parison may have a radial stretch of between 1.2 and 5, preferably between 1.2 and 3, the radial stretch being equal to the ratio between a diameter of a container and a diameter of the parison; the parison may be stretched between 0.2 m/s and 2.5 m/s, preferably between 0.5 m/s and 1.5 m/s.

If the objects are parisons and the plastic material is PP or PET, the parison may have an axial stretch of between 1 and 4, preferably between 1 and 3, the axial stretch being equal to the ratio between a height of a container and a height of the parison; the parison may have a radial stretch of between 1 and 5, preferably between 1.2 and 4, the radial stretch being equal to the ratio between a diameter of a container and a diameter of the parison; the parison may be stretched between 0.2 m/s and 2.5 m/s, preferably between 0.5 m/s and 1.5 m/s.

The apparatus may form part of a line for the production of containers (for example, for liquids or other) in continuous cycle and the line for the production of containers may further comprise a station for the blow moulding of parisons to form containers. In an example, the apparatus comprises a forming station made according to what is described in patent document IT102021000032507, in the name of the present Applicant and incorporated herein by reference. The apparatus may also comprise a blow-moulding station according to what is described in patent document IT102021000032507, incorporated herein by reference.

The apparatus comprises a metering unit. The metering unit is configured to measure a predetermined quantity of plastic, that is to say, to form doses of predetermined quantities of plastic from the continuous flow. Preferably, the metering unit is configured to form a plurality of doses of plastic simultaneously.

In an example, the metering unit includes an outlet valve system. The outlet valve system is configured to interrupt, that is, to separate the plastic, for example, between a zone upstream of the outlet valve system and a zone downstream of the outlet valve system, relative to a feed direction of the plastic from the inlet to the outlets. Preferably, the outlet valve system comprises a plurality of outlet valves. Each of the plurality of outlet valves can be positioned in a respective outfeed branch. The outlet valve system can be switched between an open configuration and a closed configuration. For this purpose, the outlet valve system may comprise a plurality of valves, shutters or interrupters. For example, in the closed configuration of the outlet valve system, the outlet valve system is configured to interrupt a flow of plastic, for example, feeding out from the distributor unit. For example, in the open configuration of the outlet valve system, the outlet valve system is configured to allow plastic to be discharged from the internal volume of the distributor unit. That way, in passing from the open configuration to the closed configuration of the outlet valves, the metering unit is configured to form a plurality of doses which are fed out from the corresponding plurality of outfeed branches of the distributor unit.

Preferably, the metering unit comprises a plurality of partition elements, or separating walls. The partition elements of the plurality may be movable between an upper position and a lower position, for example, to vary the internal volume of the distributor unit, that is to say, to vary the quantity of plastic containable inside the distributor unit.

Preferably, the metering unit includes, that is to say, it is operable in, an operative configuration or a plurality of operating configurations. For example, the metering unit comprises a charging configuration, in which the outlet valve system is in the closed configuration. For example, the metering unit comprises a discharging configuration, in which the outlet valve system is in the open configuration.

The apparatus may comprise a control unit, configured to switch the metering unit from the charging configuration to the discharging configuration and vice versa.

In an embodiment, the metering unit comprises an additional valve system. The additional valve system is preferably configured to separate, that is, to interrupt, the flow of plastic, for example, from a zone upstream of the additional valve system to a zone downstream of the additional valve system. The additional valve system can be switched between an open configuration and a closed configuration. For this purpose, the additional valve system may comprise a plurality of valves, shutters or interrupters. For example, when the metering unit is in the charging configuration, the additional valve system is in the open configuration. When the metering unit is in the discharging configuration, the additional valve system is in the closed configuration. Preferably, the additional valve system is positioned upstream of the outlet valve system. That way, the outlet valve system is configured to separate, that is, to interrupt the plastic between a zone downstream of the additional valve system and a zone downstream of the outlet valve system.

The internal volume includes a working portion, situated between the outlet valve system and the additional valve system. In other words, the portion of internal volume between the outlet valve system and the additional valve system constitutes the working portion of the internal volume. For example, the outlet valve system may be in the closed configuration and the additional valve system in the open configuration to allow plastic to be accumulated in the working portion of the internal volume. The outlet valve system may be in the open configuration and the additional valve system in the closed configuration to allow plastic to be discharged from the working portion of the internal volume.

In the example comprising the outlet valve system and the additional valve system, the partition elements of the plurality of partition elements are preferably disposed between the additional valve system and the outlet valve system. Preferably, each of the plurality of partition elements is movable between an upper limit position and a lower limit position to vary the working portion of the internal volume of the distributor unit. The working portion of the internal volume may be variable from a contracted configuration, where it has its minimum volume, to an expanded configuration, where it has its maximum volume. More specifically, the difference between the maximum volume and the minimum volume of the working portion is equal to the volume of one dose multiplied by the number of outfeed branches.

In this context, the metering unit may include a charging configuration, where the metering unit is configured to allow plastic to be accumulated, for example, in the working portion of the internal volume of the distributor unit. Preferably, in the charging configuration, the outlet valve system is in the closed configuration and the additional valve system is in the open configuration. That way, the plastic can be fed into the working portion of the internal volume. The metering unit may include a discharging configuration, where it is configured to allow plastic to be discharged, for example, from the working portion of the internal volume. In the discharging configuration, the metering unit may be configured to allow the doses of plastic, formed from the flow of plastic, to be discharged through the outlets. Thus, in the discharging configuration, the apparatus is configured to feed the doses to the plurality of seats of the plurality of female elements. Preferably, in the discharging configuration, the outlet valve system is in the open configuration and the additional valve system is in the closed configuration, so as to allow discharging the plastic from the working portion and feeding out the doses.

The control unit is preferably configured to switch the metering unit from the discharging configuration to the charging configuration with the plurality of partition elements disposed at the upper limit position. The control unit is preferably configured to switch the metering unit from the charging configuration to the discharging configuration with the plurality of partition elements disposed at the lower limit position.

In other words, the additional valve system is configured to separate a predetermined quantity of plastic from the continuous flow of plastic and to allow the predetermined quantity of plastic to advance into a zone between the additional valve system and the outlet valve system, that is, into the working portion; that way, the working portion is configured to be filled with the predetermined quantity of plastic and to expand its volume, while the partition elements are configured to move from the lower limit position to the upper limit position. The upper limit position of the partition elements is preferably a fixed position, that is to say, a position beyond which the partition element cannot move, meaning that the internal volume (or the working portion of the internal volume) cannot be expanded any further during a moulding operation.

In an example, the additional valve system comprises a main valve, located in the infeed duct. In an example, the additional valve system comprises a plurality of valves, each valve of the plurality being located in a respective outfeed branch of the plurality of outfeed branches.

It should be noted that in the example comprising the outlet valve system and the additional valve system, when the partition elements of the additional valve system are at the upper limit position, the outlet valve system is configured to separate an additional quantity of plastic from the predetermined quantity contained in the working portion; for this purpose, the outlet valve system is configured to switch to the open configuration and to allow the working portion to contract its volume to be emptied of the predetermined quantity of plastic it contains, while the partition elements are configured to move from the upper limit position to the lower limit position. Thus, the additional predetermined quantity of plastic separated by the outlet valve system is equivalent to the difference between a volume of the working portion with the partition elements at the upper limit position and a volume of the working portion with the partition elements at the lower limit position. More specifically, the additional predetermined quantity of plastic defines the volume of the plastic doses. Thus, the volume of each of the doses is known precisely.

In an embodiment, each partition element of the plurality of partition elements is positioned in a respective outfeed branch, upstream of the respective outlet valve. For example, the partition elements are movable from the upper position to the lower position to vary the internal volume of the distributor unit. In the embodiment comprising the additional valve system and the plurality of partition elements, when the metering unit is in the charging configuration, the outlet valve system is in the closed configuration to interrupt a flow of plastic from the distributor unit and, for example, when the metering unit is in the discharging configuration, the outlet valve system is in the open configuration to allow plastic to be discharged from the internal volume of the distributor unit. In this context, moving the partition elements from the upper limit position to the lower limit position, with the metering unit in the discharging configuration, and from the lower limit position to the upper limit position, with the metering unit in the charging configuration, produces a plurality of doses of plastic fed to the plurality of seats. During the movement from the lower limit position to the upper limit position, the plastic advances from the inlet and accumulates inside the internal volume, with the outlet valve system in the closed configuration. During the movement from the upper limit position to the lower limit position, the plastic leaves the internal volume, with the outlet valve system in the open configuration. In the example comprising the outlet valve system and the plurality of partition elements, one dose, that is to say, one quantity of plastic forming a dose fed to a respective seat of the plurality, is defined by the quantity of plastic contained downstream of the respective outlet valve, with the outlet valve in the closed configuration and the respective partition element at the lower limit position.

Compared to the embodiment comprising the outlet valve system and the additional valve system, the apparatus comprising the outlet valve system has the advantage of being less complex, while maintaining the advantage of precision.

It is noted that the outlet valve system and the partition elements constitute distinct elements of the apparatus and that they also have two distinct functions: the outlet valve system has the function of dividing the continuous flow (or, when the additional valve system is also present, it has the function of further dividing the quantity of plastic contained in the working portion), while the partition elements have the function of feeding the dose from the internal volume (or, when the additional valve system is present, from the working portion of the internal volume), towards the outlet.

When present, the additional valve system is also a distinct element and has a different function than the partition elements; more specifically, the additional valve system has the function of dividing the continuous flow into doses.

In an example, the metering unit, in addition to or, preferably, alternatively to, the partition elements, the outlet valve system and the additional valve system, comprises a plurality of cutting devices, each cutting device being located at an outlet and being switchable between an open configuration, to allow the plastic to be fed out from the outlet, and a closed configuration, in which it is configured to close the outlet and thus to separate a quantity of plastic forming the corresponding dose. Thus, in an example, the cutting devices provide an alternative solution to the valves and the partition elements, where the plastic is extruded from the outfeed branch and a cutting device is configured to divide the extruded plastic into portions. The apparatus may comprise a sensor system including a plurality of sensors, each sensor of the plurality being configured for detecting, in real time, a flow parameter correlated with a flow rate of the plastic in each outfeed branch; a control unit may be connected to the sensor system and to the cutting devices to drive them as a function of the flow parameter. Preferably, the flow parameter represents a length of a stretch of plastic extruded through each outlet and disposed outside the distributor unit.

In an example, each cutting device comprises a first knife and a second knife, the first knife and the second knife each including a first blade and a second blade, positioned on opposite sides of the respective knife with respect to a direction of movement of the knife, the first knife and the second knife being juxtaposed with each other along the direction of movement. The first and the second knife may be movable relative to each other to exchange positions between the open position and the further open position by way of the closed position in moving from the open position to the further open position. More specifically, at the closed position of the first and the second knife, the first and the second knife are configured to act in conjunction to cut the dose at the outlet. That way, at each change of position, the first and the second knife allow a dose to be separated rapidly and without obstructing the respective outlet.

In an example, at least one of the plurality of partition elements may be movable between the lower limit position and the upper limit position by pressure applied by the plastic on the at least one partition element. Alternatively, or in addition, the metering unit may comprise an actuator for at least one partition element of the plurality of partition elements or one actuator for each partition element of the plurality of partition elements. In an example, the metering unit may include a group of actuators, where each actuator of the group of actuators is connected to a respective partition element of the plurality of partition elements. The actuator may be configured to move the respective partition element between the upper limit position and the lower limit position, preferably continuously. The actuator has the advantage of precisely controlling the upper limit position and the lower limit position of a partition element, in particular during a moulding operation.

In an example, the control unit may be configured to drive one or more of the actuators of the group of actuators to move the corresponding partition elements from the upper limit position to the lower limit position, preferably with the metering unit in the discharging configuration. The control unit may be configured to drive one or more of the actuators of the group of actuators to move the corresponding partition elements from the lower limit position to the upper limit position, preferably with the metering unit in the charging configuration. That way, it is possible to make a plurality of doses of plastic which can be fed to the plurality of seats.

In an example, the plurality of partition elements comprises a group of partition elements including a plurality of secondary partition elements. Preferably, each partition element of the plurality of secondary partition elements is located in a respective outfeed branch of the plurality of outfeed branches. The secondary partition elements, located in the outfeed branches, have the advantage of being able to regulate the quantity of plastic feeding out from the outlets of the outfeed branches.

In an example, the plurality of partition elements comprises a main partition element. Preferably, the main partition element is located in the infeed duct of the distributor unit. The main partition element, located in the infeed duct, has the advantage of regulating the flow of plastic and allowing feeding of a total quantity of plastic consisting of the sum of all the doses; this total quantity of plastic is then divided between the plurality of outfeed branches by the distribution zone to form the plurality of doses.

Preferably, the upper limit position or the lower limit position of at least one partition element of the plurality of partition elements is adjustable, for example in such a way as to vary the maximum quantity of plastic containable in the internal volume or in the working portion of the internal volume. That way, it is possible to adjust the maximum quantity of plastic containable in the internal volume (or rather, in each branch of the plurality of branches) or in the working portion of the internal volume, for example, if the outfeed branches are geometrically different from each other.

In an example, the outlet valve system comprises a plurality of pushers. For example, each pusher may be located at a respective outfeed branch. Each pusher may be reciprocally movable between a retracted position and a plurality of advanced positions. For example, the retracted position is a position of non-interference with a flow of plastic in the respective outfeed branch. For example, the advanced position is a position in which the pusher closes the respective outfeed branch. Preferably, at the plurality of advanced positions, the pusher is configured to push the respective dose through the outlet, for example by moving in an extraction direction between the advanced positions. Preferably, at the retracted position, the pusher keeps the respective outlet valve of the outlet valve system open. Preferably, at the plurality of advanced positions, it keeps the respective outlet valve of the outlet valve system closed. That way, while the pusher keeps the respective outlet valve closed, a respective valve of the additional valve system is in the open configuration so as to allow plastic to advance into the working volume portion of the distributor unit. In moving between the advanced positions in an extraction direction, the pusher has the advantage of further separating the plastic from the working portion and pushing the dose out of the outlet.

In an example, the control unit is programmed to control the upper limit position or the lower limit position of at least one partition element of the plurality of partition elements, preferably for a moulding operation of a succession of moulding operations. Preferably, the control unit is programmed to control the upper limit position or the lower limit position based on a check parameter (that is, according to a check parameter). Alternatively, the control unit may be configured to drive one or more actuators according to the check parameter. The check parameter may represent the moulding operation of the succession of moulding operations or a previous moulding operation, or a plurality of previous moulding operations. The check parameter may be processed at the end of a cycle for moulding plastic objects, for example, outside the apparatus for producing the objects or at the end of or during a moulding operation. In an embodiment, the check parameter represents a difference between a volume or a mass of one dose feeding out from the outfeed branch and a reference value for the volume or mass of the dose. The check parameter may be derived from an optical sensor or from a flow sensor or from a weight sensor. The optical sensor may be located between the outlets of the outfeed branches and the plurality of female elements, to measure the quantity of plastic feeding out from the outlets of the outfeed branches, for example, by measuring a length of the dose fed out. The flow sensor may be located in the outfeed branches or in the inlet to measure the flow rate of the plastic feeding out from the outlets or in through the infeed duct. That way, the apparatus is configured to regulate the predetermined quantity of plastic, preferably by feedback, that is to say, the quantity of plastic forming the dose through the check parameter. The weight sensor may be located in a seat of the plurality of seats to measure a weight of one dose in the respective seat.

In an example, each female element of the plurality of female elements is movable along a longitudinal axis of movement between a spaced-apart position of non-interference with the respective male element of the plurality of male elements, and a close-together position where it closes a forming cavity, acting in conjunction with the respective male element to compress a dose. Each male element may be connected to an elastic element to be able to make an settling movement along the longitudinal axis of movement, for example, reacting to the compression of the dose at the closed position of the forming cavity. Preferably, the control unit can be programmed to derive the check parameter as a function of the settling movement. For this purpose, the male element can make an settling movement, for example, proportional to the volume of the dose contained in the forming cavity. The apparatus may comprise a distance sensor programmed to measure a distance of the settling movement. The control unit can be connected to the distance sensor to receive the distance of the settling movement from the distance sensor. The control unit may be programmed to process the check parameter, based on the distance received from the distance sensor, and to derive a control parameter. The control unit may be connected to at least one partition element of the plurality of partition elements, or to an actuator of at least one partition element, to control the upper limit position of the at least one partition element of the plurality of partition elements through the control parameter. That way, it is possible to adjust the quantity of plastic inside the working portion of the internal volume and thus to adjust the volume of a dose.

In an example, the apparatus comprises a flow sensor. The flow sensor is preferably configured to measure a flow parameter, representing a flow rate of the plastic flowing, for example, in the outfeed branches of the plurality of outfeed branches or, more preferably, in the infeed duct. The control unit may be connected to the flow sensor to receive the flow parameter. The control unit may be programmed to drive one or more of the actuators according to the flow parameter.

In an example, the apparatus comprises a compensation unit, preferably positioned upstream of the plurality of outfeed branches of the distributor unit. The compensation unit may be in fluid communication with the infeed duct. The compensation unit preferably defines an internal compensation volume, variable from a maximum volume configuration to a minimum volume configuration, for example with the metering unit in the discharging configuration, and from the minimum volume configuration to the maximum volume configuration, for example with the metering unit in the charging configuration. The purpose of the compensation unit is to compensate the variations in the pressure applied by the plastic when the outlet valve system or the additional valve system is in the closed configuration.

In an example, the apparatus comprises a compensation actuator, connected to the compensation unit to vary the compensation volume, for example between the maximum volume configuration and the minimum value configuration.

In an example, the control unit is programmed to derive an imbalance parameter and, preferably, to drive one or more of the actuators according to the imbalance parameter. The imbalance parameter may represent an imbalance between the plastic flow rates in the outfeed branches of the plurality of outfeed branches, or an imbalance between the doses of plastic, or an imbalance between the moulded objects.

The control unit may be connected to the outlet valves to control them in synchronized manner. For example, the control unit may switch the outlet valves from the open configuration to the closed configuration, and vice versa, in synchronized manner. In addition, the control unit may control the outlet valves to control each of them independently of the others. For this purpose, the control unit can delay opening or closing of an outlet valve, for example based on the imbalance parameter or on the flow parameter or on the check parameter.

In an example, the apparatus comprises an extruder. The extruder may be connected to the infeed duct to feed it with the continuous flow of pressurized molten plastic. The apparatus may comprise a volumetric pump, positioned downstream of the extruder and connected to the infeed duct to feed it with pressurized molten plastic. The control unit may be programmed to control the extruder or the volumetric pump according to one or more between the check parameter, the flow parameter and the imbalance parameter. The purpose of the volumetric pump is to keep the pressure constant at the inlet of the distributor unit.

Thus, the apparatus may be made according to at least three approaches. In a first approach, the additional valve system comprises a valve (main valve) located preferably in the infeed duct, to allow plastic to flow in the infeed duct and to allow the main partition element to move to the upper limit position to receive a quantity of plastic (equal, as a whole, to the sum of the doses); in the first approach, the plastic is then divided between the plurality of branches, starting from the distribution zone, and the quantity of plastic forming the dose may be adjusted through the secondary partition elements and then separated into doses by the outlet valve system. In a second approach, the additional valve system is located in the plurality of outfeed branches and separates the flow of plastic only after the flow has been divided between the plurality of outfeed branches, starting from the distribution zone. In this second approach, therefore, the additional valve system comprises a plurality of valves and the number of valves of the additional valve system is preferably equal to the number of outfeed branches, and the partition elements, located in the outfeed branches, each partition element moving to the upper limit position to receive a respective dose. In the second approach, as in the first approach, the outlet valve system then separates the plastic into doses. Thus, these approaches differ in, amongst other things, the positioning of the additional valve system.

Both approaches have the advantage of providing a particularly precise volumetric metering system capable of tolerating the fluctuations in the flow of plastic, for example, feeding out from an extruder or, more generally speaking, fluctuations in the flow of plastic upstream of the apparatus.

In a third approach, the flow of plastic enters the infeed duct and is divided between the plurality of outfeed branches and the partition elements, located in the outfeed branches, move to the upper limit position with the outlet valve system in the closed configuration, to receive the plastic; after that, with the outlet valve system in the open configuration, the partition elements move to the lower limit position to feed the doses towards the outlets and the outlet valve system returns to the closed configuration to interrupt the flow of plastic and to form the doses. Compared to the first and second approaches, since the internal volume does not have the working portion, the third approach provides a semi-volumetric metering system which comprises, preferably, a control unit to adjust the partition elements (or, when present, the extruder or the volumetric pump) based on the check parameter, the imbalance parameter or the flow parameter, so as to ensure that the doses are precise and identical to each other.

This disclosure also relates to a method for producing objects in continuous cycle from plastic material.

The method comprises a step of providing a distributor unit that may include a plurality of outfeed branches having respective outlets. The method comprises a step of providing an infeed duct having an inlet. The infeed duct may be in communication with the outfeed branches through a distribution zone. Preferably, the distributor unit defines an internal volume between the inlet and the outlets. The method may comprise a step of receiving raw plastic, for example, in an extruder unit. The method may comprise a step of feeding pressurized molten plastic to the infeed duct of the distributor unit, for example from the extruder unit. The method may comprise a step of receiving a flow of molten plastic at the inlet of the infeed duct, for example from the extruder unit. The method may include a step of distributing the flow of plastic from the inlet of the infeed duct to a distribution zone of the distributor unit. The method may include a step of distributing, that is, dividing, the flow of plastic through the distribution zone to the plurality of outfeed branches.

The method comprises a step of providing a metering unit including an outlet valve system. In an example, the outlet valve system includes a plurality of outlet valves. Each outlet valve can be positioned in a respective outfeed branch.

In an embodiment, the method comprises a step of providing a plurality of partition elements. Each partition element of the plurality of partition elements may be positioned in a respective outfeed branch, preferably upstream of the respective outlet valve. Preferably, each partition element of the plurality of partition elements is movable between an upper limit position and a lower limit position, for example to vary the internal volume of the distributor unit.

The method may comprise a step of providing a group of actuators. Each actuator of the group of actuators may be connected to a respective partition element of the plurality to move it between the upper limit position and the lower limit position. In other words, the method may comprise a step of moving at least one of the plurality of partition elements between the upper limit position and the lower limit position by means of an actuator. The method may comprise a step of closing the outlet valve system, for example through a control unit, to interrupt the flow of plastic feeding out from the distributor unit. The method may comprise a step of controlling one or more actuators of the group of actuators, for example through the control unit, to move the corresponding partition elements from the lower limit position to the upper limit position. The method may comprise a step of opening the outlet valve system, for example through the control unit, to allow plastic to be discharged from the internal volume of the distributor unit and a step of controlling one or more actuators of the group of actuators, for example through the control unit, to move the corresponding partition elements from the upper limit position to the lower limit position so as to produce a plurality of doses of plastic.

The method comprises a step of providing an additional valve system. For example, the method includes a step of positioning the additional valve system upstream of the outlet valve system, relative to a feed direction of the plastic from the inlet to the outlets. The internal volume may comprise a working portion, included between the additional valve system and the outlet valve system, where the working portion is preferably variable from a contracted configuration, where it has its minimum volume, to an expanded configuration, where it has its maximum volume. The plurality of partition elements may be movable between the upper limit position and the lower limit position to vary the working portion of the internal volume of the distributor unit. For example, when the plurality of partition elements are at the upper limit position, the working portion of the internal volume is in the expanded configuration and, when the partition elements of the plurality are at the lower limit position, the working portion of the internal volume is in the contracted configuration.

The method may comprise a step, for example through a control unit, of closing the outlet valve system and opening the additional valve system, to allow plastic to accumulate in the working portion of the internal volume. The method may comprise a step, through the additional valve system, of separating, that is, interrupting, the flow of molten plastic to form a predetermined quantity of plastic. The method may comprise a step, for example through a control unit, of closing the additional valve system and opening the outlet valve system, to allow plastic to be discharged from the working portion of the internal volume. During the closing of the additional valve system and the opening of the outlet valve system, the method may comprise a step of feeding the doses of plastic out through the outlets. The method may comprise a step, through the outlet valve system, of separating, that is, interrupting, the predetermined quantity of plastic into an additional predetermined quantity of plastic to form the doses.

The method comprises a step of feeding a plurality of seats of a plurality of female elements with the doses, preferably simultaneously, where the plurality of female elements may be located at the plurality of outfeed branches. The method comprises a step of compressing the doses between a plurality of female elements and a corresponding plurality of male elements to form a plurality of objects of plastic material. In an example, the objects are parisons intended for blow moulding to form containers; the method may thus include a step of blow moulding the objects, that is, the parisons to form containers.

In an example, the method may include a step of providing the outlet valve system to include a plurality of pushers, for example, located in the plurality of outfeed branches.

Each pusher can move reciprocally between the retracted position, where it opens the respective outfeed branch, and a plurality of advanced positions, where it closes the respective outfeed branch. The method may include a step of moving the pusher between the advanced positions in an extraction direction. The method may include a step of pushing each dose by means of the respective pusher through the respective outlet, for example keeping the respective outlet valve closed. In other words, each pusher, as it moves in the extraction direction between the advanced positions, pushes the respective dose through the outlet while keeping the respective outlet valve closed.

In an example, in addition to or alternatively to, the outlet valve system, the additional valve system and the partition elements, the method comprises a step of providing a plurality of cutting devices, each cutting device being located at an outlet and a step of opening each cutting device to allow plastic to be fed out from the outlet, and closing each cutting device to close the outlet and thus to separate a quantity of plastic forming the corresponding dose. The apparatus may comprise the steps of providing a plurality of sensors and, through each of the plurality of sensors, of detecting, in real time, a flow parameter correlated with a flow rate of the plastic in each outfeed branch. The method may comprise a step of receiving the flow parameter, closing the cutting devices and opening the cutting devices as a function of the flow parameter. In an example, the method comprises a step of closing during a step of opening and further opening the first and the second knife, which exchange positions and act in conjunction to cut the dose at the outlet.

In an example, the method comprises a step, through a control unit, of controlling an upper limit position of at least one partition element of the plurality of partition elements. For example, the step of controlling is carried out for a moulding operation of a succession of moulding operations. Preferably, control is based on a parameter representing a previous moulding operation or a plurality of previous moulding operations. In other words, the method may include a step of feedback control. The parameter may be a check parameter, a flow parameter or an imbalance parameter. In another example, control is based on a check parameter representing the moulding operation in which the step of controlling is carried out. For example, the method may include a feedback-controlled step of adjusting a quantity of plastic forming the dose. In an example, the method comprises a step of moving the partition elements by means of the actuator or the group of actuators, according to one or more between the check parameter, the flow parameter and the imbalance parameter.

In an example, the method comprises a step of processing a check parameter. The step of processing may be carried out at the end of a moulding cycle, for example, by an operator, or during or at the end of a previous moulding operation in the apparatus.

For example, the method may comprise a step of measuring, with an optical sensor or a flow sensor, a volume or a mass of a dose feeding out from the outfeed branch. In an example, the method comprises a step of moving each female element of the plurality of female elements along a longitudinal axis of movement between a spaced-apart position of non-interference with the respective male element of the plurality of male elements, and a close-together position where it closes a forming cavity, relative to the respective male element. The method may comprise a step of compressing a dose between each female element and the respective male element when the forming cavity is at the closed position.

The method may comprise a step of each male element, connected to an elastic element, making an settling movement along the longitudinal axis of movement following the step of compressing. In an example, the method comprises a step of deriving the check parameter through the control unit, for example, as a function of the step of settling movement. For this purpose, the method comprises a step of adaptively moving a male element in proportion to the volume of the dose contained in the forming cavity. The method may comprise a step of measuring a distance of the settling movement by means of a distance sensor. The method may include a step of the control unit receiving the distance of the settling movement from the distance sensor. The method may comprise a step of processing the check parameter, based on the distance received from the distance sensor, in order to derive a control parameter. The method may comprise a step of connecting to at least one partition element of the plurality of partition elements or to an actuator of at least one of the plurality of partition elements. The method may also comprise a step of controlling, with the control parameter, the upper limit position of at least one partition element of the plurality of partition elements.

In an example, the method comprises a step of controlling the outlet valves in synchronized manner through the control unit.

In an embodiment, the method comprises a step of feeding the continuous flow of pressurized molten plastic to the infeed duct through an extruder or through a volumetric pump positioned downstream of the extruder and connected to the infeed duct. The method may comprise a step of controlling the extruder or the volumetric pump through the control unit according to one or more between the check parameter, the flow parameter and the imbalance parameter.

BRIEF DESCRIPTION OF THE DRAWINGS

These and other features will become more apparent from the following description of a preferred embodiment, illustrated by way of non-limiting example in the accompanying drawings, in which:

FIGS. 3A, 3B, 3C, 3E, 3F, 3G show a detail of the apparatus according to one or more aspects of this disclosure;

FIG. 3D shows a partition element of the plurality of partition elements according to one or more aspects of this disclosure;

FIGS. 5A-5G show a sequence of operating configurations of a detail of the apparatus according to one or more aspects of this disclosure;

DESCRIPTION OF EXAMPLE EMBODIMENTS

Figure 1:
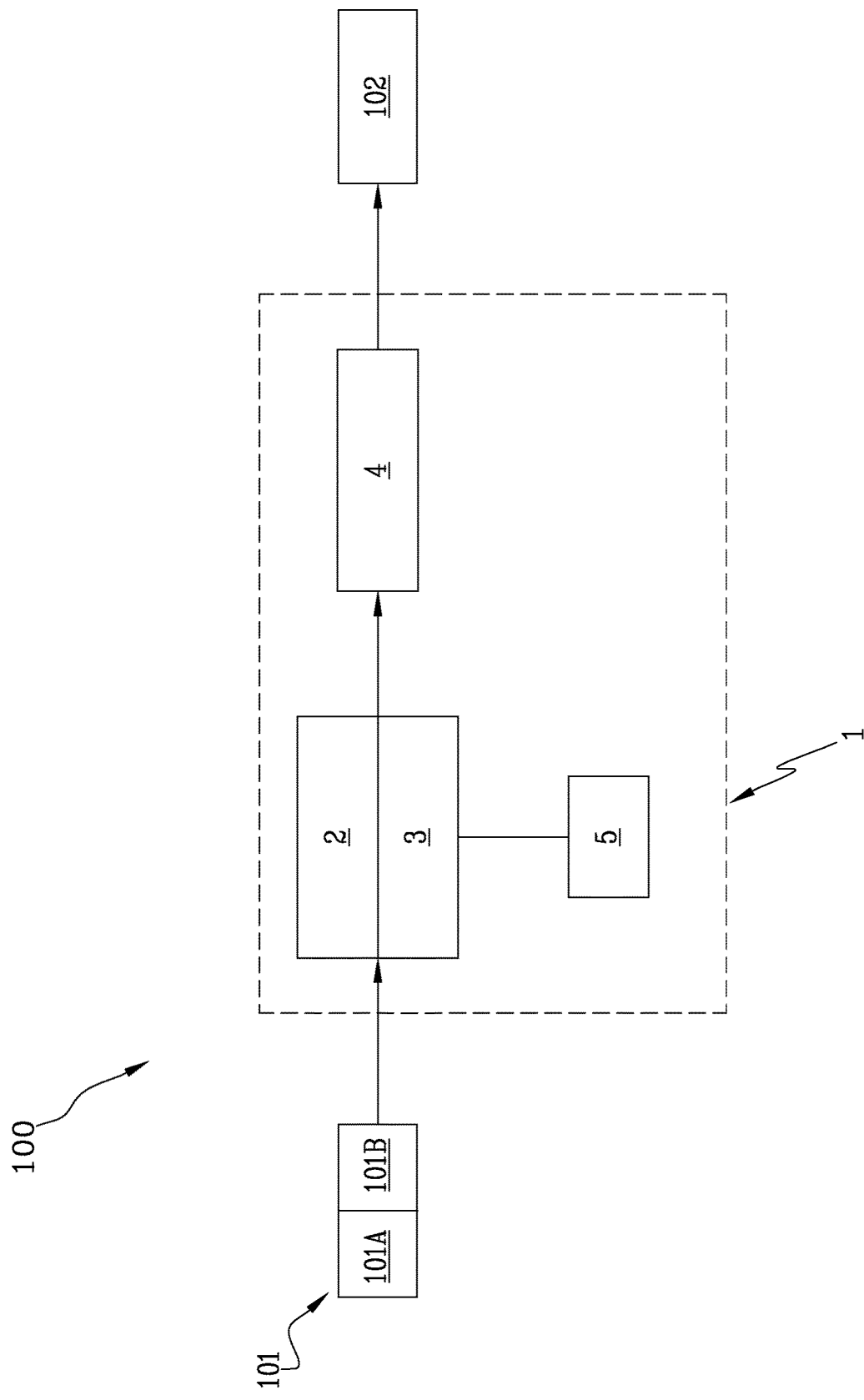
FIG. 1 shows a part of a container production line comprising the apparatus according to one or more aspects of this disclosure.
Figure 2:
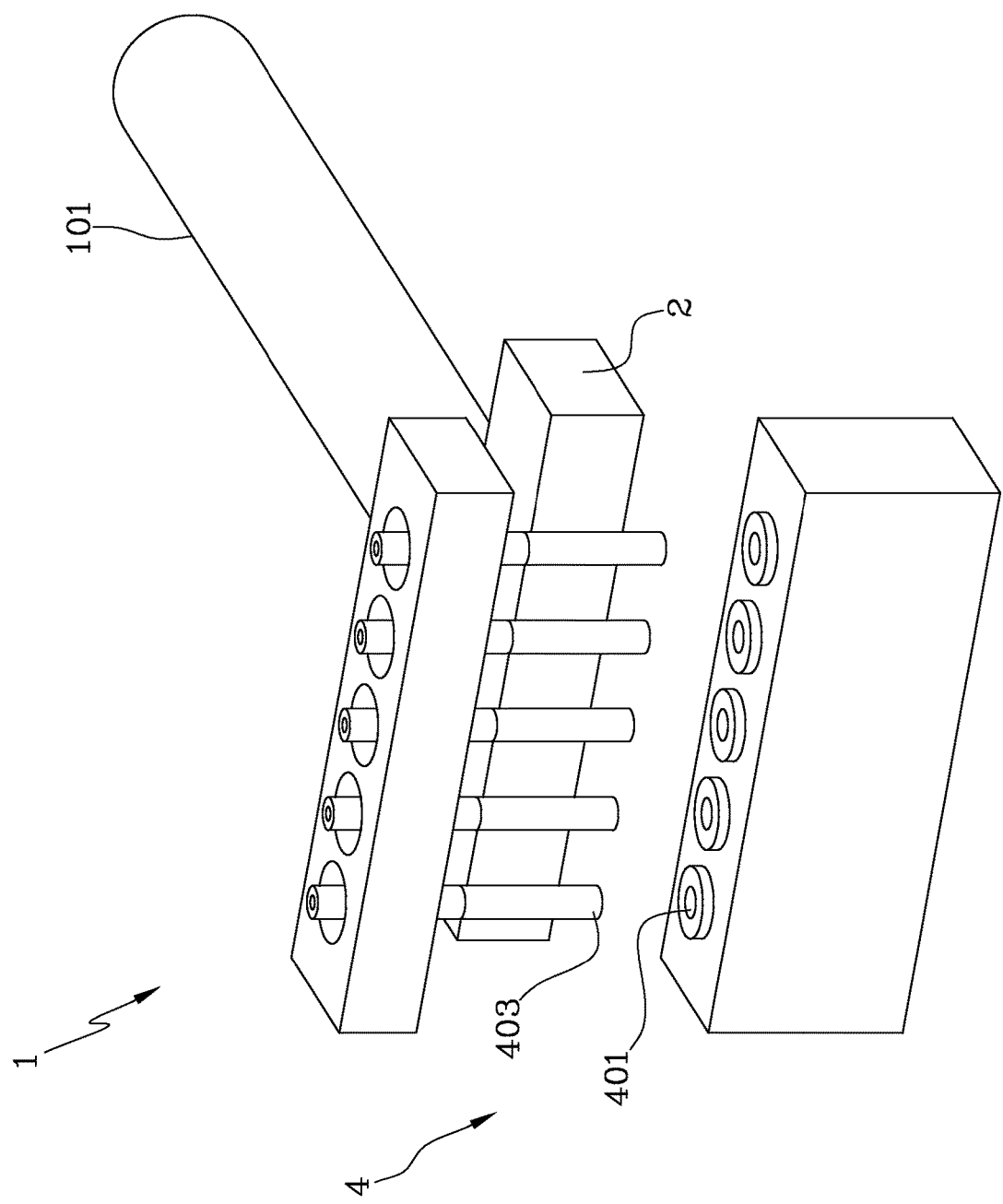
FIG. 2 shows the apparatus according to one or more aspects of this disclosure.

With reference to the accompanying drawings, the numeral 1 denotes an apparatus for producing objects in continuous cycle from plastic material. The apparatus 1 comprises a distributor unit 2. The distributor unit 2 is configured to distribute a flow of molten plastic. The distributor unit 2 includes an infeed duct 201, having an inlet 202, configured to receive a continuous flow of plastic, preferably from an extruder unit 101. The extruder unit 101 includes an inlet, configured to receive plastic in raw form and to feed out a flow of molten plastic. Preferably, an outlet of the extruder unit 101 is located at the infeed duct 201, that is, at the inlet 202, to receive the flow of molten plastic, for example, in pressurized form. In an example, the extruder unit 101 comprises an extruder 101A and a volumetric pump 101B, where the volumetric pump 101B is located between the extruder 101A and the infeed duct 201 and is configured to provide the pressurized flow of plastic.

The distributor unit 2 includes a plurality of outfeed branches 203; each outfeed branch 203 is in fluid communication with the infeed duct 201 to receive the flow of plastic from the infeed duct 201. For this purpose, between the infeed duct 201 and the plurality of outfeed branches 203, there is a distribution zone 204 that is configured to receive the flow of molten plastic from the infeed duct 201 and to distribute the flow of molten plastic to each of the plurality of outfeed branches 203. That way, the flow of plastic is divided between the plurality of outfeed branches 203. Each outfeed branch 203 includes an outlet 205, configured to feed plastic to the distributor unit 2. The distributor unit 2 defines an internal volume between the inlet 202 and the outlets 205 of the plurality of outfeed branches 203.

Preferably, each outfeed branch 203 includes a first branch 203A, configured to receive the plastic from the distribution zone 204, and a second branch 203B including the outlet 205. The first branch 203A and the second branch 203B are in communication with each other and, preferably, are disposed perpendicularly to each other in such a way that the plastic is gravity fed to the outlet 205 through the second branch 203B. In an example, the distribution zone 204 comprises a first distribution zone 204A, located downstream of the infeed duct 201, and a second distribution zone 204B, located downstream of the first distribution zone 204A; the first distribution zone 204A divides the flow of plastic from the infeed duct 201 into a plurality of flows of plastic, while the second distribution zone 204B further divides each flow of the plurality of flows of plastic into a further plurality which is subsequently received by the outfeed branches 203.

The apparatus 1 comprises a metering unit 3, located inside the distributor unit 2 and configured to form, from the continuous flow of plastic fed into the infeed duct 201, the doses fed out from the outlets 205.

The metering unit 3 comprises an outlet valve system 302 which can be switched between a closed configuration and an open configuration. The outlet valve system 302 comprises a plurality of pushers 302A and each pusher 302A is located in a respective outfeed branch 203. More specifically, each pusher 302A is inserted in the second branch 203B and is movable reciprocally between a retracted position of non-interference with a flow of plastic in the second branch 203B, and a plurality of advanced positions where it closes the respective second branch 203B. At the plurality of advanced positions, the pusher 302A is configured to push the respective dose through the outlet 205, by moving in an extraction direction between the advanced positions so as to keep the respective valve closed.

In an example, each pusher 302A includes an outer pusher 302B and an inner pusher 302C, wherein the outer pusher 302B is located externally of the inner pusher 302C; that is, the outer pusher 302B externally surrounds the inner pusher 302C. Preferably, the outer pusher 302B and the inner pusher 302C are mutually movable. The pusher 302A may include an air duct 302D, comprised between outer pusher 302B and inner pusher 302C. The air duct 302D is configured to allow a flow of air to pass through. For example, the outer pusher 302B and the inner pusher 302C can reciprocally move (through an axial translation) to put the air duct 302D into communication with the outlet 205, for example to allow a flow of air to exit through the outlet 205. In the retracted position, the outer pusher 302B and the inner pusher 302C cooperate to interrupt communication of the air duct 302D with the outlet 205. In at least one advanced position of the plurality of advanced positions, the outer pusher 302B and the inner pusher 302C cooperate to put the air duct 302D in communication with the outlet 205, in particular to allow an air flow to exit through the outlet 205. For example, in at least one advanced position of the plurality of advanced positions, the inner pusher 302C can be moved forward or backward, so that the inner pusher 302C is extracted (or retracted) relatively to the outer pusher 302B, to put the air duct 302D in communication with the outlet 205.

The metering unit 3 comprises a plurality of partition elements 303, 303A, 303B, each movable between an upper limit position X1 and a lower limit position X2. In an example, illustrated by way of example in FIG. 3C, the plurality of partition elements comprises a group of partition elements including a plurality of secondary partition elements 303B. Each partition element 303B of the plurality of secondary partition elements 303B is movable between the upper limit position X1 and the lower limit position X2 to vary the internal volume of the distributor unit 2 and is positioned in a respective outfeed branch 203, upstream of the respective pusher 302A. The metering unit 3 includes a charging work configuration, in which the pushers 302A are in the closed configuration to interrupt the flow of plastic feeding out from the distributor unit 2. In the charging configuration, the secondary partition elements 303B are disposed at the upper limit position X1 and the internal volume adopts an expanded configuration, that is, a maximum volume configuration, because the secondary partition elements 303B are disposed at the upper limit position X1. The metering unit 3 also includes a discharging work configuration, in which the additional valve system 301 is in the closed configuration, to allow discharging plastic from the internal volume and feeding doses of plastic out through the outlets 205 and the secondary partition elements 303B are disposed at the lower limit position X2. In the discharging configuration, the internal volume adopts a contracted configuration, that is, a minimum volume configuration, because the secondary partition elements 303B are disposed at the lower limit position X2.

Figure 3A:
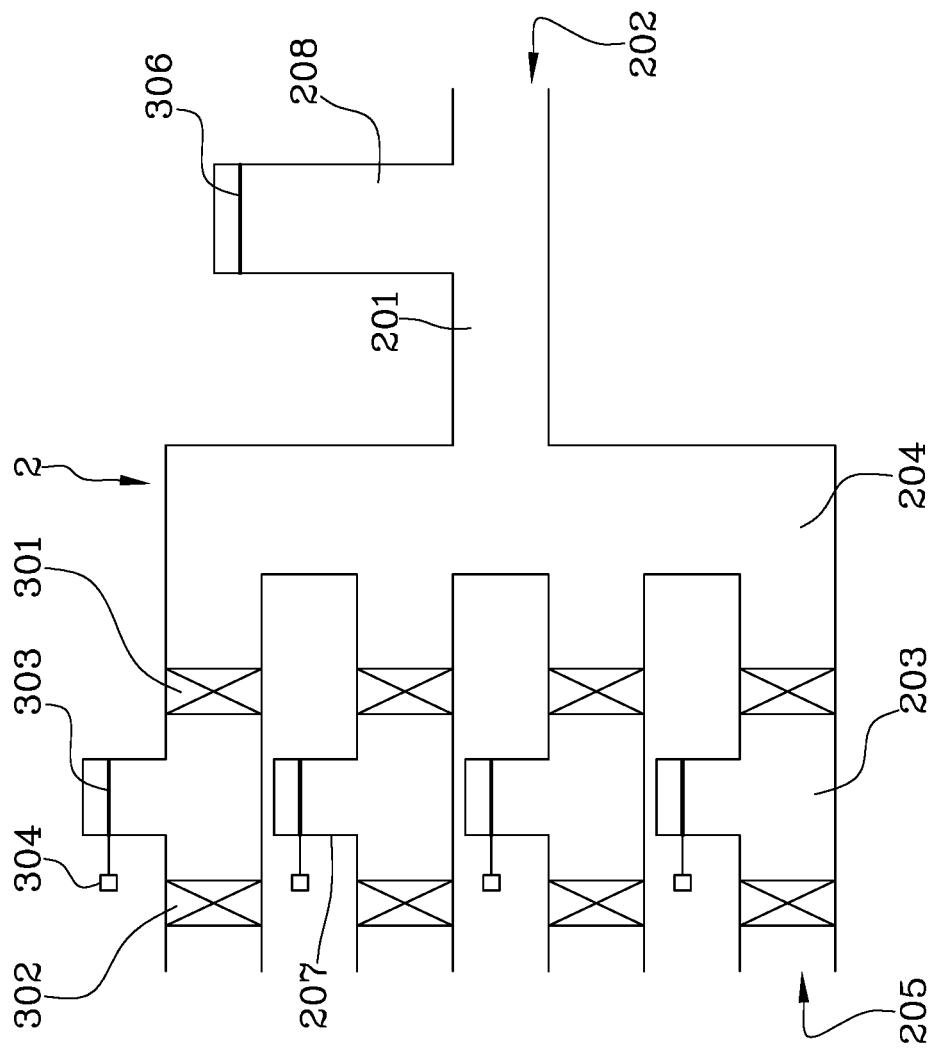
Figure 3B:
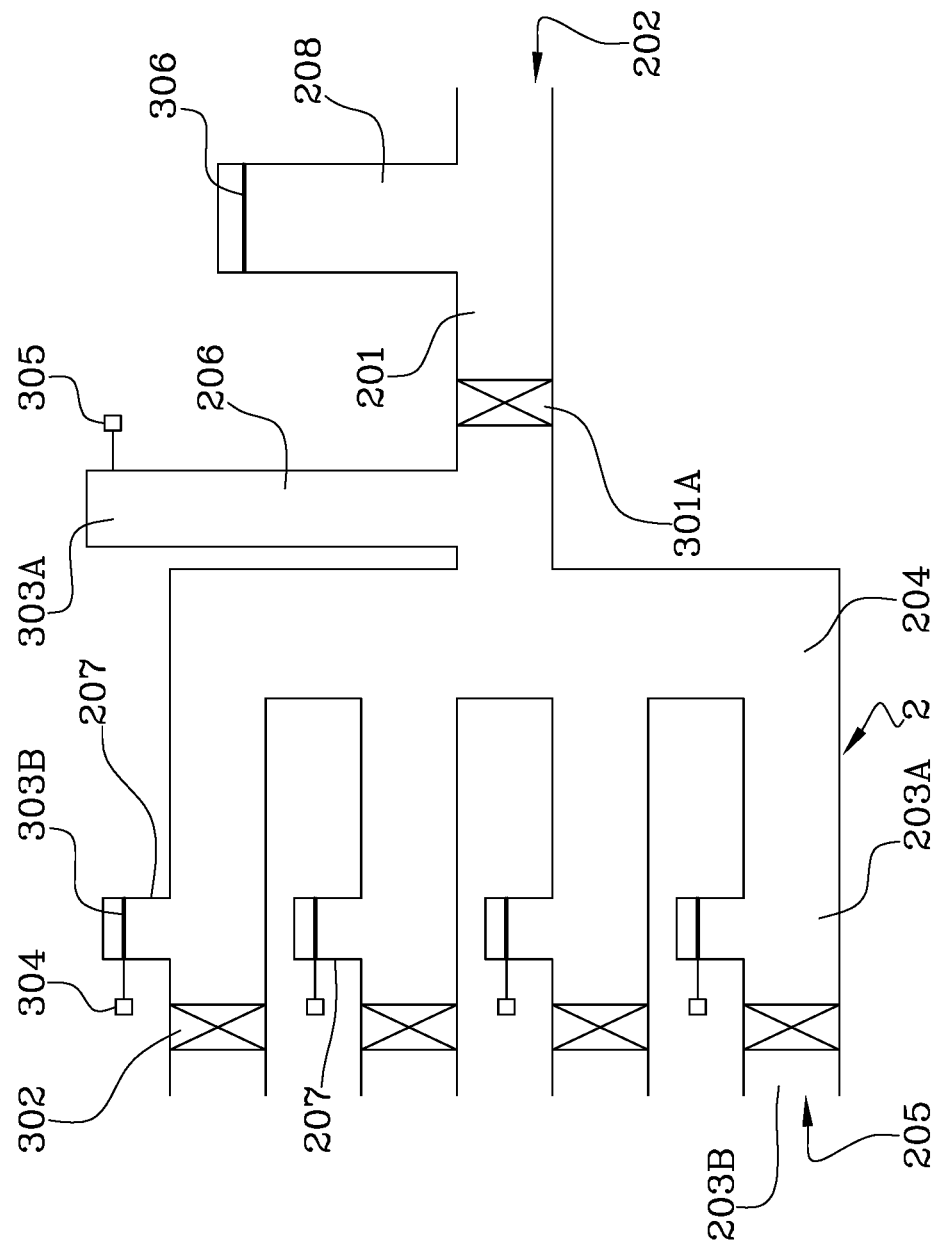
Figure 3E:
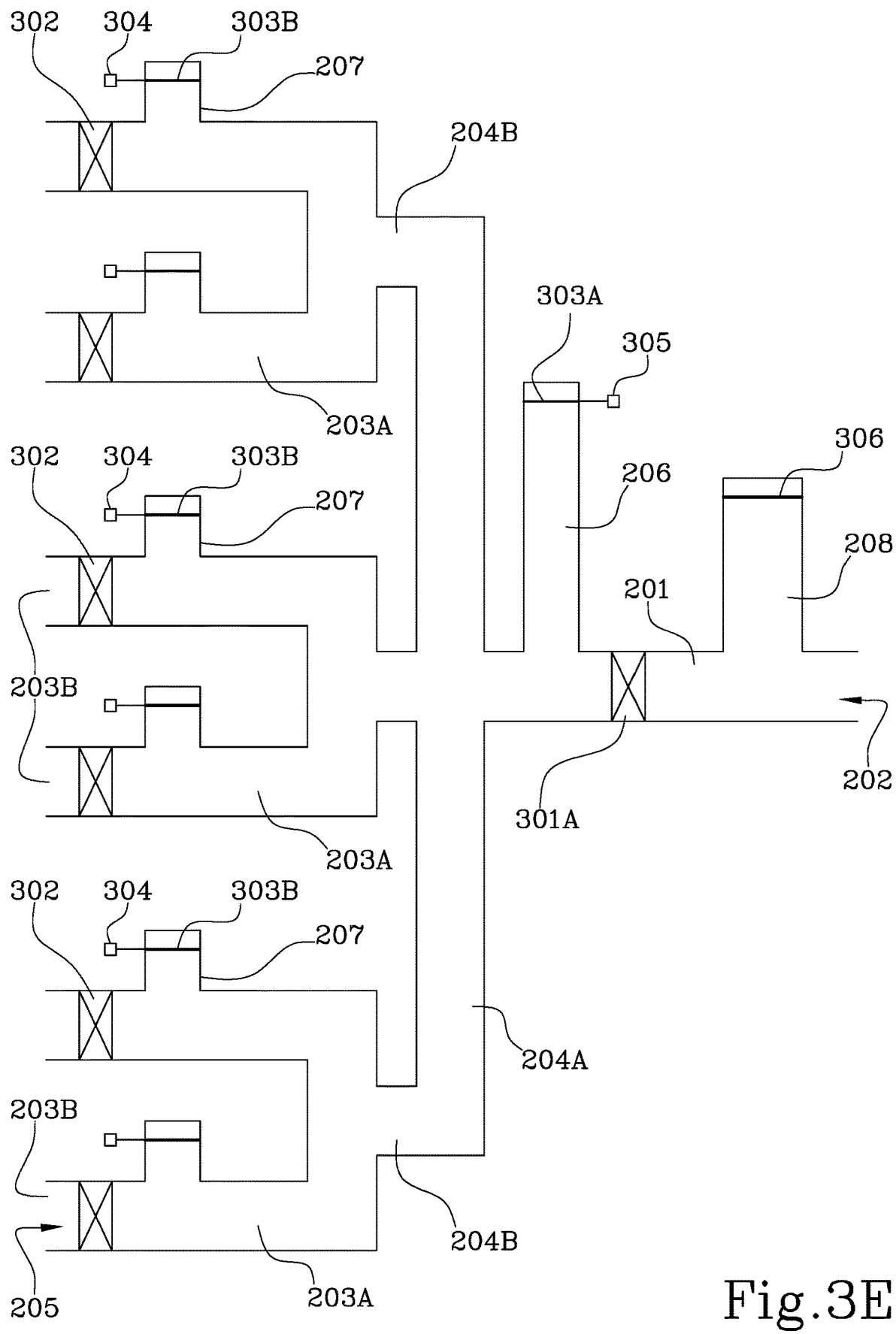
Figure 3F:
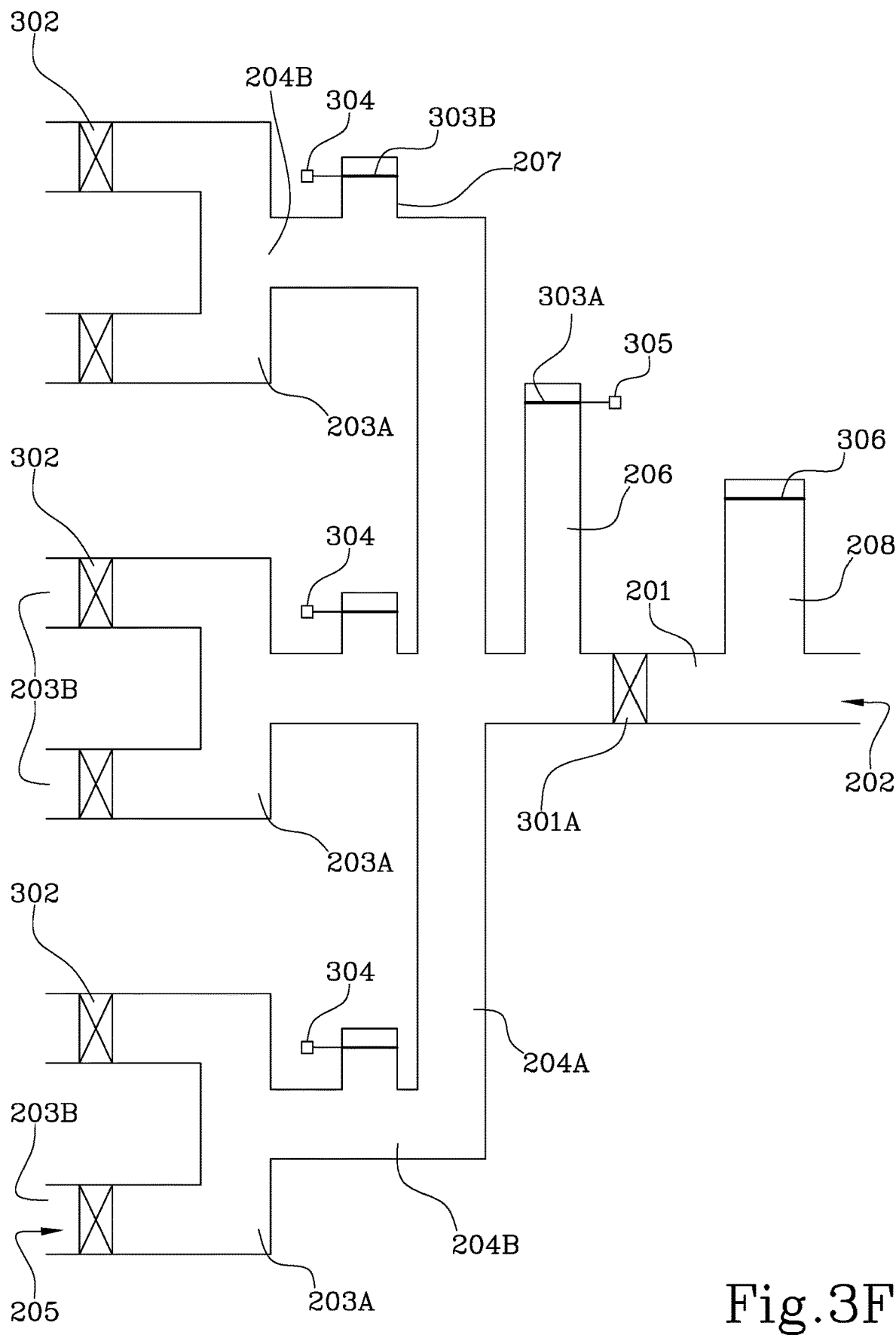
Figure 3G:
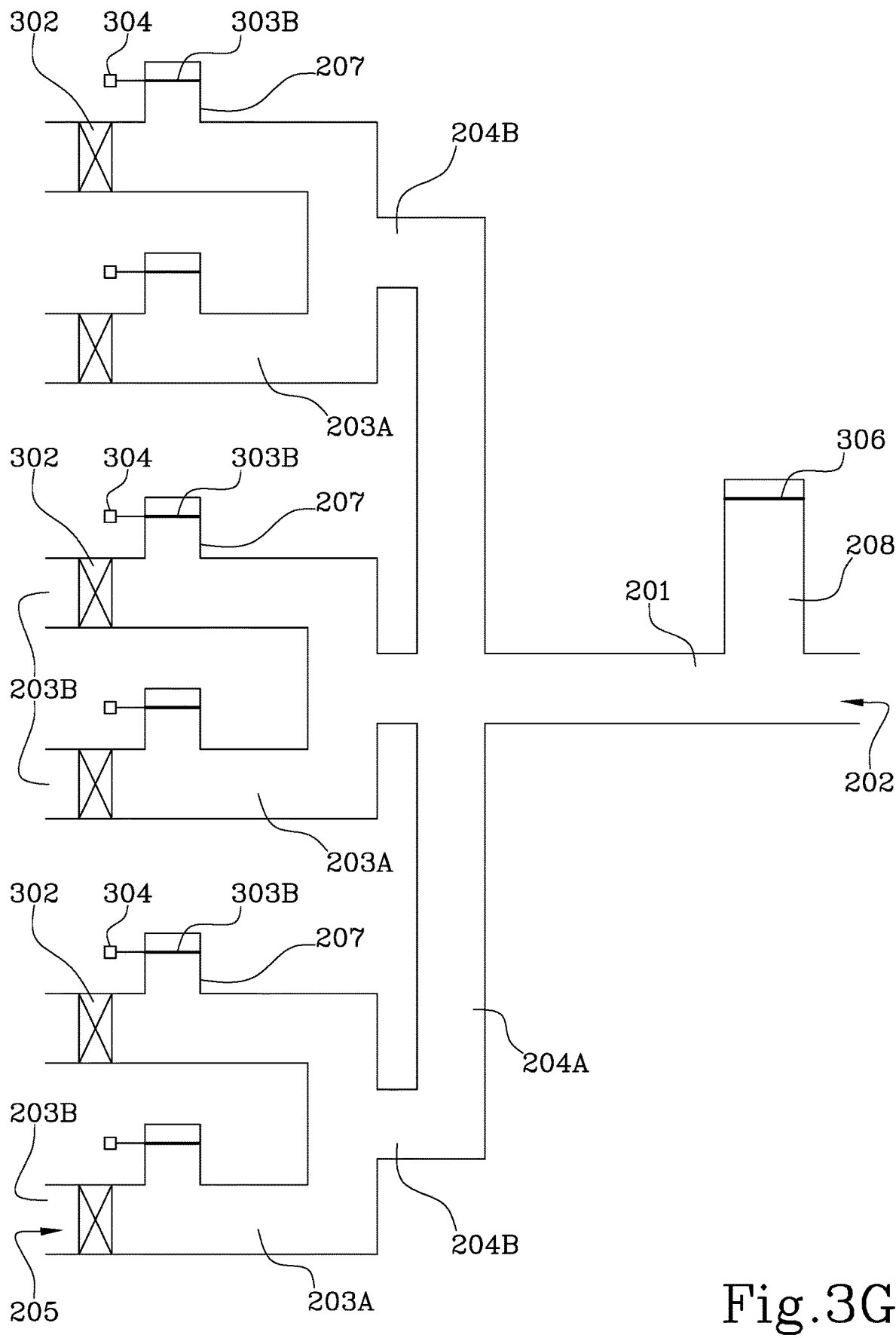
Figure 4C:
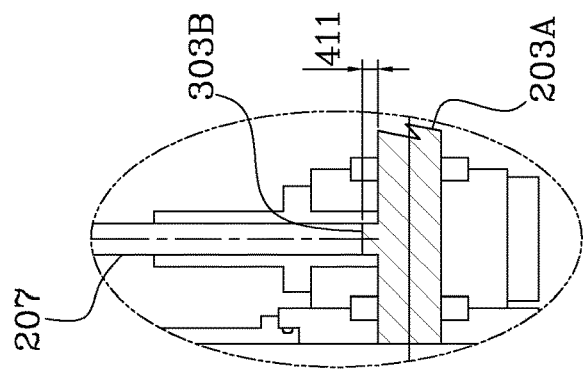
FIG. 4C shows a detail of the apparatus according to one or more aspects of this disclosure.
Figure 4B:
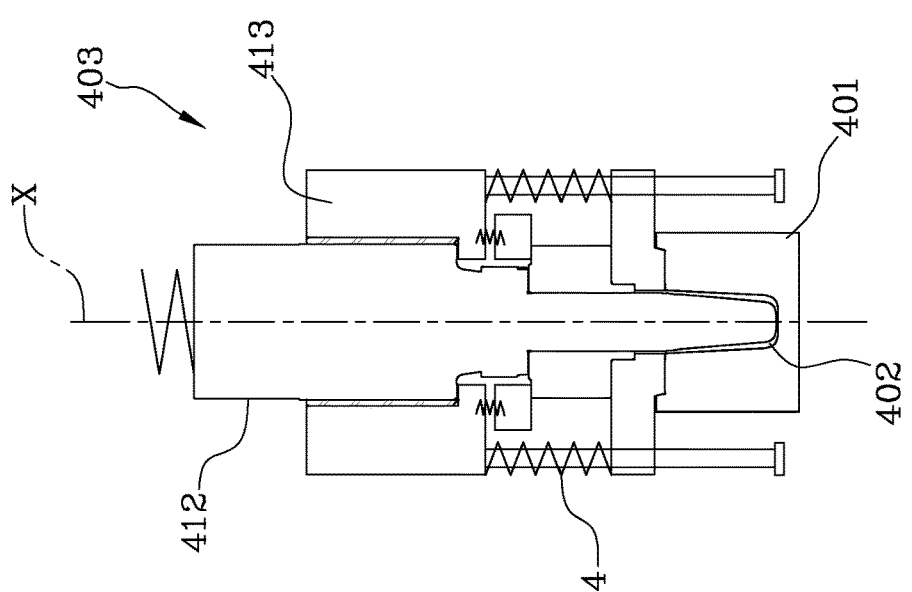
FIGS. 4B and 4D show a male element and a female element at the close-together position where they close the forming cavity according to one or more aspects of this disclosure.
Figure 4A:
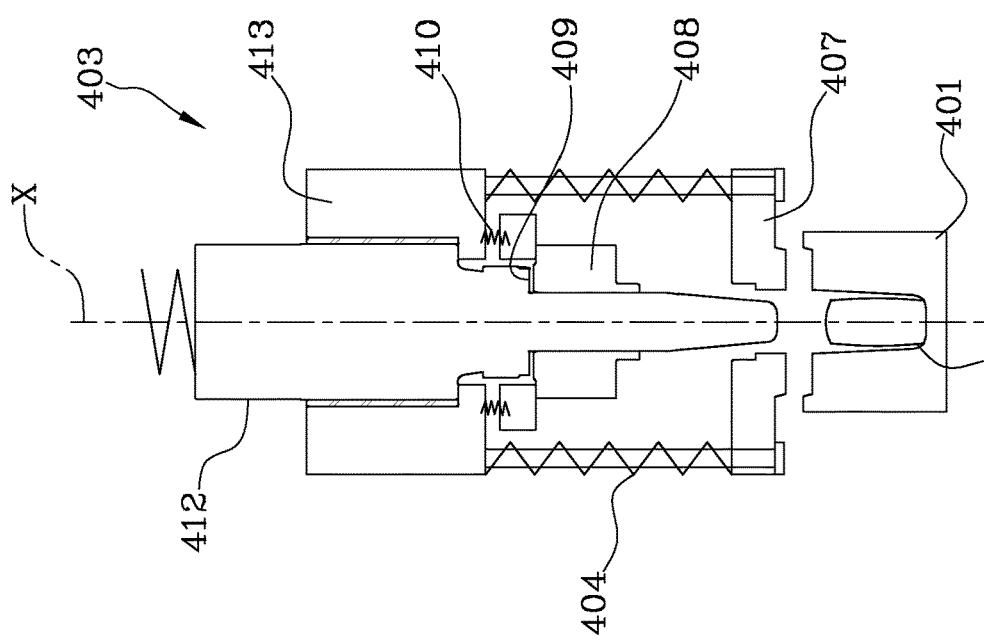
FIG. 4A shows a male element and a female element at the spaced-apart position according to one or more aspects of this disclosure.
Figure 4D:
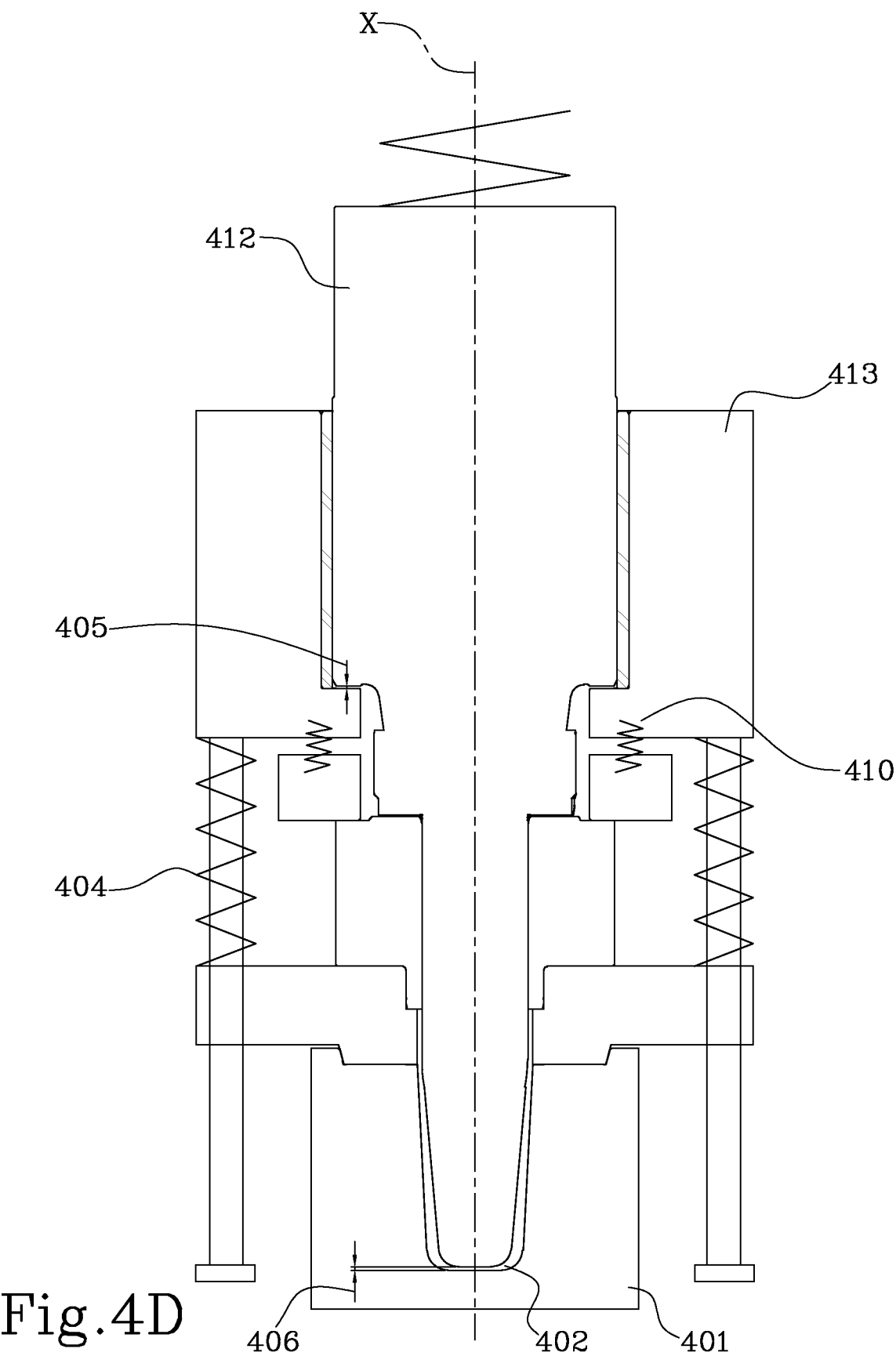
Figure 5D:
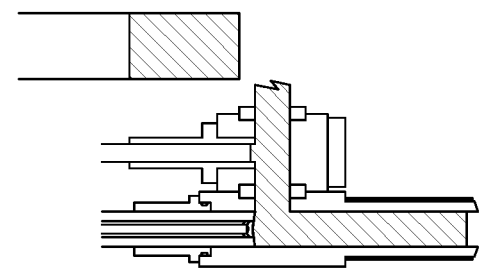
Figure 5C:
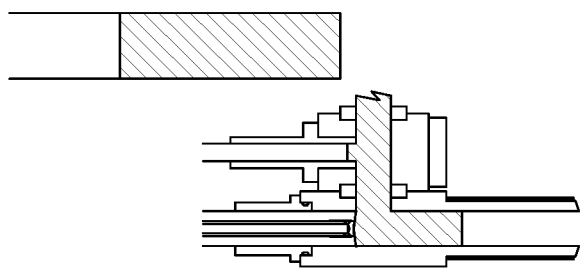
Figure 5B:
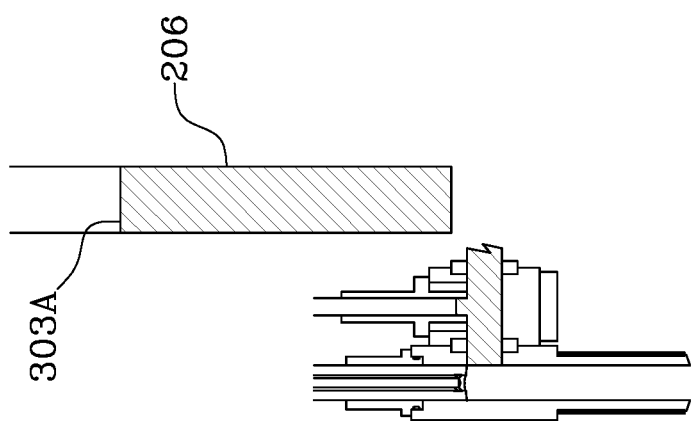
Figure 5A:
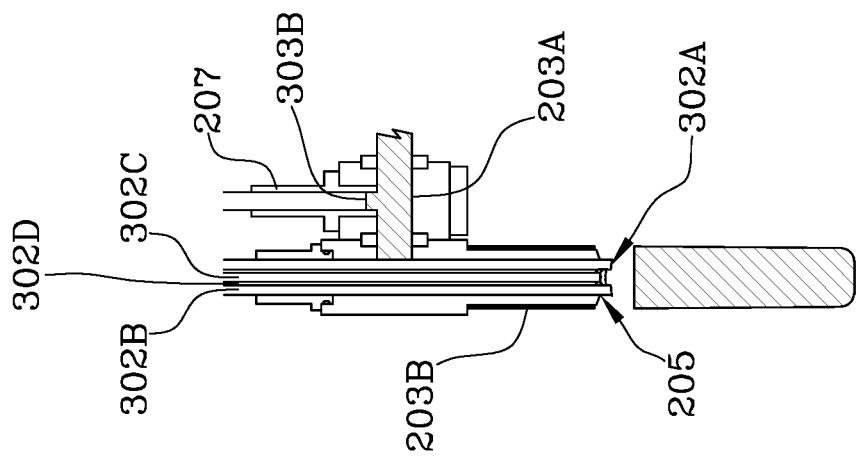
Figure 6D:
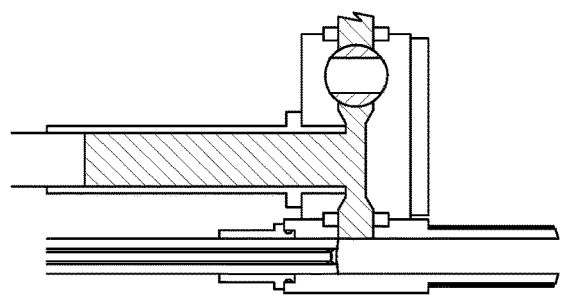
FIGS. 6A-6H show a sequence of operating configurations of a detail of the apparatus according to one or more aspects of this disclosure.
Figure 6C:
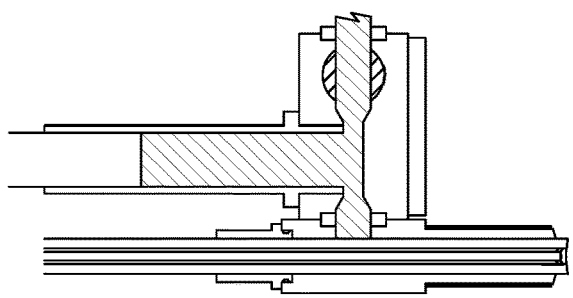
Figure 6B:
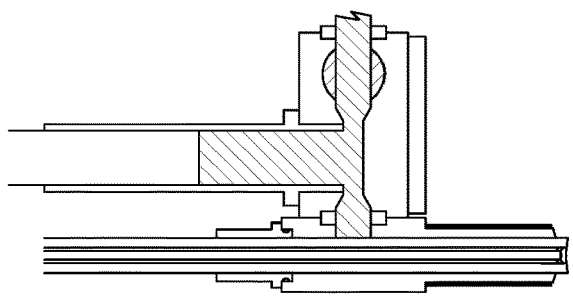
Figure 6A:
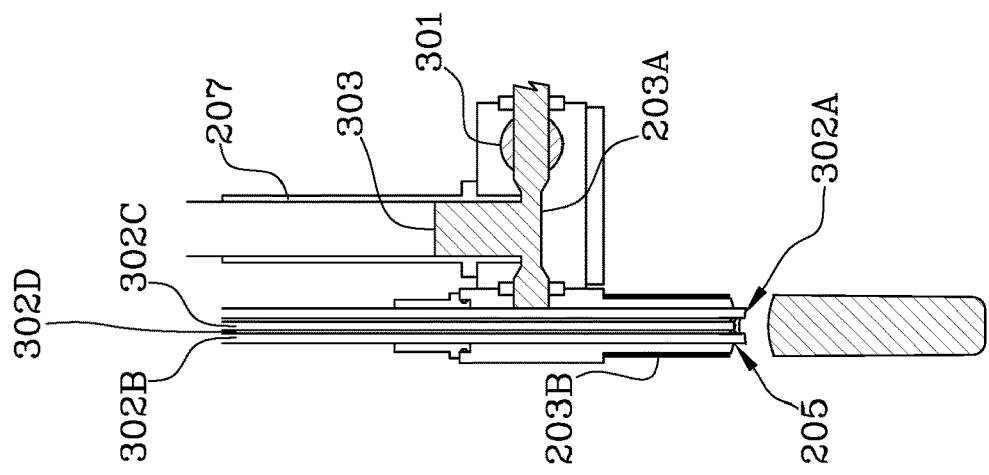
Figure 6H:
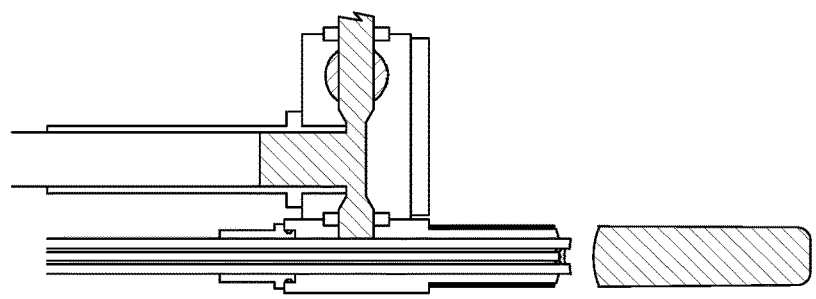
Figure 6G:
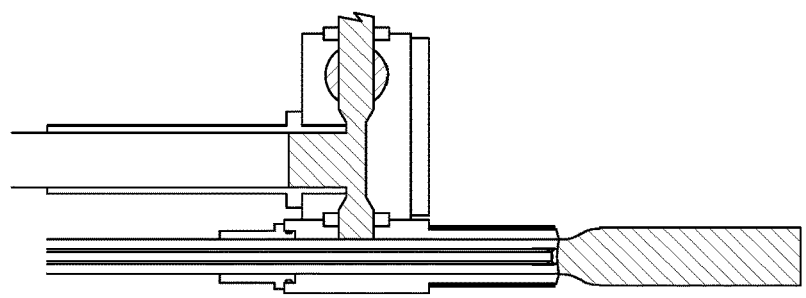
Figure 6F:
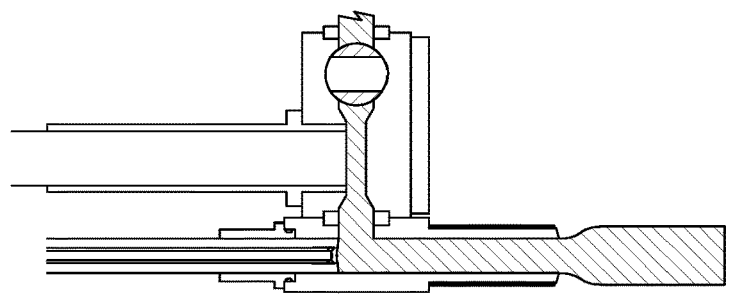
Figure 6E:
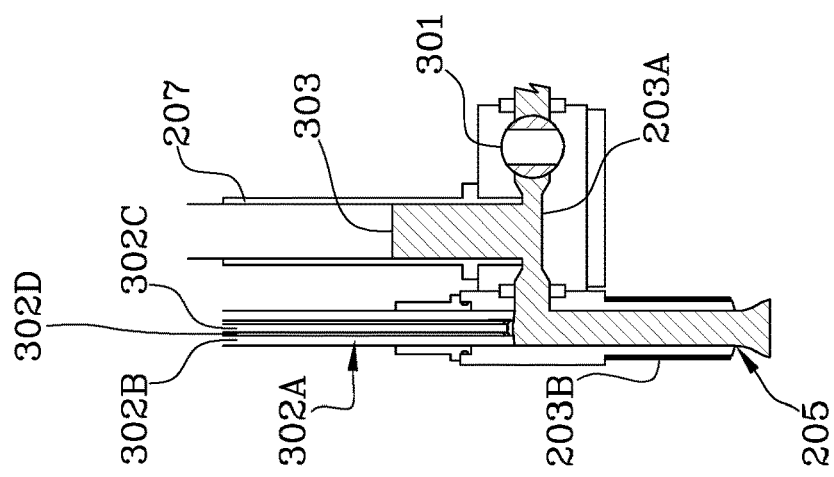

In an embodiment, illustrated by way of example in FIGS. 3A and 3B, the metering unit 3 comprises the outlet valve system 302, a plurality of partition elements 303, 303A, 303B and an additional valve system 301, comprising a plurality of valves 301. The outlet valve system 302 is located downstream of the additional valve system 301 relative to the feed direction of the plastic from the inlet 202 to the outlets 205 of the distributor unit 2. The additional valve system 301 can be switched between an open configuration and a closed configuration. In the open configuration, the additional valve system 301 allows the plastic to advance from a zone upstream of the additional valve system 301 to a zone downstream of the additional valve system 301. Similarly, in the open configuration, the outlet valve system 302 allows the plastic to advance from a zone upstream of the outlet valve system 302 to a zone downstream of the outlet valve system 302. Thus, in passing from the open configuration to the closed configuration, the additional valve system 301 and the outlet valve system 302 are configured to divide the flow of molten plastic in the distributor unit 2.

The internal volume of the distributor unit 2 comprises a working portion included between the additional valve system 301 and the outlet valve system 302.

The metering unit 3 includes a charging work configuration, in which the outlet valve system 302 is in the closed configuration and the additional valve system 301 is in the open configuration, to allow plastic to accumulate in the working portion. In the charging configuration, the partition elements 303, 303A, 303B are disposed at the upper limit position X1 and the internal volume adopts an expanded configuration, that is, a maximum volume configuration, because the partition elements 303, 303A, 303B are disposed at the upper limit position X1. The metering unit 3 also includes a discharging work configuration, in which the additional valve system 301 is in the closed configuration and the outlet valve system 302 is in the open configuration, to allow discharging plastic from the working portion of the internal volume and feeding doses of plastic out through the outlets 205 and the partition elements 303, 303A, 303B are disposed at the lower limit position X2. In the discharging configuration, the working portion of the internal volume adopts a contracted configuration, that is, a minimum volume configuration, because the partition elements 303, 303A, 303B are disposed at the lower limit position X2.

Generally speaking, the difference in volume between the working portion in the expanded configuration and the working portion in the contracted configuration is equal to the volume of one dose multiplied by a number of outfeed branches 203 of the plurality of outfeed branches 203.

In an embodiment, illustrated by way of example in FIG. 3A, the plurality of partition elements comprises a plurality of secondary partition elements 303B, each located in a respective outfeed branch 203 of the plurality and the additional valve system comprises a plurality of valves 301, located upstream of the secondary partition elements 303B in the outfeed branches 203. In this case, the working portion of the internal volume is located in the plurality of outfeed branches 203.

In an embodiment, illustrated by way of example in FIG. 3B, the plurality of partition elements comprises a plurality of secondary partition elements 303B, each located in a respective outfeed branch 203 of the plurality and a main partition element 303A located in the infeed duct 201; the additional valve system 301 includes a main valve 301A, located in the infeed duct 201 of the distributor unit 2. More specifically, the main valve 301A is located upstream of the main partition element 303A. In this case, the working portion of the internal volume is located between the infeed duct 201 and the plurality of outfeed branches 203.

The volume of each dose is equal to the difference between the working portion in the expanded configuration and the working portion in the contracted configuration, divided by the number of outfeed branches 203.

In an example embodiment, each outfeed branch 203 includes a secondary leg 207, in fluid communication with the respective outfeed branch 203 and configured to receive a respective partition element 303 (specifically, a respective secondary partition element 303B).

In an example, each secondary leg 207 and the respective outfeed branch 203 are disposed perpendicularly to each other (relative to a flow direction of the plastic). In this example, the volume of one dose of a plurality of doses is equal to the difference between the volume of the respective secondary leg 207 with the partition element 303 (or the secondary partition element 303B) at the upper limit position X1 and the volume of the respective secondary leg 207 with the partition element 303 (or the secondary partition element 303B) at the lower limit position X2.

In the example comprising the main partition element 303A, located downstream of the main valve 301A, the infeed duct 201 includes a main leg 206, in fluid communication with the infeed duct 201 and configured to receive the main partition element 303A. Preferably, the main leg 206 and the infeed duct 201 are disposed perpendicularly to each other.

The apparatus 1 comprises a control unit 5, configured to switch the metering unit 3 from the charging configuration to the discharging configuration, with the plurality of partition elements 303, 303A, 303B positioned at the lower limit position X2, and from the discharging configuration to the charging configuration, with the plurality of partition elements 303, 303A, 303B positioned at the upper limit position X1.

The apparatus 1 comprises a forming station 4 for compression moulding. The forming station 4 includes a plurality of female elements 401, positionable at the plurality of outfeed branches 203 of the distributor unit 2, to receive the plurality of doses being fed out from the outlets 205. The plurality of female elements 401 defines a corresponding plurality of seats 402 configured to receive a corresponding plurality of doses of plastic being fed out. More specifically, in the discharging configuration, the additional valve system 301 is in the closed configuration and the outlet valve system 302 is in the open configuration, to feed the doses to the plurality of seats 402 of the plurality of female elements 401. The forming station 4 includes a plurality of male elements 403, configured to act in conjunction with the plurality of female elements 401 to delimit a corresponding plurality of forming cavities to form a plurality of objects simultaneously from plastic material by compression. For this purpose, each female element 401 is movable along a longitudinal axis of movement X between a spaced-apart position of non-interference with the respective male element 403, and a close-together position where it closes a forming cavity, acting in conjunction with the respective male element 403 to compress a dose. In an example, the control unit 5 is programmed to move each female element 401 along the longitudinal axis of movement X.

In an example embodiment, the objects of plastic material are parisons intended for subsequent blow moulding to form containers. For this purpose, the apparatus 1 may form part of a line 100 for the production of containers (for example, for liquids or other) in continuous cycle and the production line 100 may comprise a parison blow moulding station 102 for forming containers, and an extruder unit 101.

In an example, the control unit 5 is configured to open and close the additional valve system 301 and the outlet valve system 302.

In an example, the metering unit 3 comprises a plurality of actuators or a group of actuators 304 and each actuator 304 of the plurality or of the group is connected to the partition elements 303, 303A, 303B, specifically to the secondary partition elements 303B located in the secondary leg 207 to move them between the upper limit position X1 and the lower limit position X2. Alternatively, the partition elements 303, 303A, 303B, specifically the secondary partition elements 303B, move under the action of the pressure of the plastic: when the plurality of valves 301 or the main valve 301A is at the open position, and the pushers 302A are at the closed position, the partition elements 303, 303A, 303B (or the secondary partition elements 303B) are configured to move to the upper limit position X1, whereas, when the plurality of valves is at the closed position and the pushers 302A are at the open position, the partition elements 303, 303A, 303B (or the secondary partition elements 303B) are configured to move to the lower limit position X2 because the plastic applies a lower pressure on the partition elements 303, 303A, 303B.

The upper limit position X1 is adjustable so as to vary the maximum quantity of plastic containable in the working portion of the internal volume and, more specifically, to vary the volume of the dose.

The control unit 5 is programmed to drive the actuators and to control the upper limit position X1 and the lower limit position X2 based on a check parameter, based on a flow parameter or based on an imbalance parameter. When the extruder 101A and the volumetric pump 101B are present, the control unit is programmed to control the extruder 101A and the volumetric pump 101B as a function of the check parameter, of the flow parameter or of the imbalance parameter. More specifically, for each outfeed branch, the control unit 5 is programmed to receive a check parameter representing a difference between a volume or a mass of one dose feeding out from the outfeed branch and a reference value for the volume or mass of the dose. In an example, the check parameter is derived by an optical sensor that measures the quantity of plastic feeding out from the outlets 205 or by a flow sensor that measures the flow rate of the plastic in the plurality of outfeed branches 203. The check parameter may represent a previous moulding operation preceding the moulding operation whose upper limit position X1 or lower limit position X2 is to be controlled; in other words, the control unit 5 is programmed to adjust by feedback a quantity of plastic forming one dose. In another example, the check parameter is processed for a moulding operation in real time to check the position during that same moulding operation. The control unit 5 is programmed to process a control parameter based on the check parameter. The control unit 5 is connected to each actuator 304 to send the control parameter to adjust the upper limit position X1 or the lower limit position X2 of the respective partition element based on the control parameter.

In an example, the metering unit 3 comprises a primary actuator 305 connected to the main partition element 303A to move it between the upper limit position X1 and the lower limit position X2 and, for example, the secondary partition elements 303B move between the upper limit position X1 and the lower limit position X2 on account of the pressure applied by the plastic. In another example, the main partition element 303A and the secondary partition elements 303B move between the upper limit position X1 and the lower limit position X2 on account of the pressure applied by the plastic.

In an embodiment, each female element 401 of the plurality of female elements 401 is movable along a longitudinal axis of movement X between a spaced-apart position of non-interference with the respective male element 403 of the plurality of male elements 403, and a close-together position where it closes a forming cavity, acting in conjunction with the respective male element 403 to compress a dose. Each male element 403 is connected to an elastic element 404 to be able to make an settling movement along the longitudinal axis of movement X, reacting to the compression of the dose at the closed position of the forming cavity. Thus, the settling movement made by the male element 403 is proportional to a size 406 of a volume of the compressed dose. For this purpose, the apparatus 1 comprises a sensor for measuring a distance 405 of the settling movement. The control unit 5 is connected to the sensor to receive the distance 405 of the settling movement and to process the check parameter. The control unit 5 is programmed to process a control parameter based on the check parameter. The control unit 5 is connected to each actuator 304 to send the control parameter and to adjust the upper limit position X1 of the respective partition element 303, 303A, 303B.

Preferably, each male element 403 comprises a punch 412, a structure 413, a first abutment element 407 connected to the structure 413 by a first elastic element 404, and a second abutment element 408 connected to the structure by a second elastic element 410; when the female element 402 is at the close-together position, the first abutment element 407 is configured to abut with the second abutment element 408, the second abutment element 408 is configured to abut with a contoured abutment surface 409 of the punch 412, and the punch 412 is configured to make an settling movement along the longitudinal axis of movement X. More specifically, the settling movement includes the distance 405, proportional to the size 406 of the volume of one dose. The control unit 5 is configured to process the control parameter as a function of the distance 405 of the settling movement and to adjust the upper limit position X1 by an adjustment distance 411 of the partition element 303, 303A, 303B.

In an embodiment, the apparatus comprises a flow sensor configured to capture the flow parameter representing a flow rate of the plastic flowing in the infeed duct 201; the control unit 5 is connected to the flow sensor to receive the flow parameter and to drive the actuators 304 and, alternatively or in addition, the main actuator 305 according to the flow parameter, in particular based on a control parameter processed according to the flow parameter.

In an embodiment, the apparatus 1 comprises a compensation unit 208, located in the infeed duct 201; the compensation unit 208 may be located in the infeed duct 201 and upstream of the plurality of outfeed branches 203 relative to the feed direction of the plastic from the inlet 202 to the outlets 205. When the main valve 301A is present, the compensation unit 208 is positioned upstream of the main valve 301A. When the plurality of valves 301 is present, the compensation unit 208 is positioned upstream of the plurality of valves 301. The compensation unit 208 defines an internal compensation volume, variable from a maximum volume configuration to a minimum volume configuration, with the metering unit 3 in the discharging configuration, and from the minimum volume configuration to the maximum volume configuration, with the metering unit 3 in the charging configuration.

The compensation unit 208 includes a compensating partition element 306; the compensating partition element 306 is movable inside the compensation unit 208, preferably freely, under the pressure applied by the inflowing plastic so as to vary the quantity of plastic contained in the compensation volume. Thus, it is noted that the purpose of the compensation unit 208 is to compensate the pressure variations when the main valve 301A or the plurality of valves 301 are in the closed configuration. In an example, the compensation unit 208 is located in an extruder unit 101; for this purpose, the extruder unit 101 comprises a variable volume, downstream of its screw feeder which is, for example, configured to move back and define the compensation volume. In an example not illustrated, the compensation unit may comprise a compensation actuator to vary the compensation volume between the maximum volume configuration and the minimum value configuration.

The method for producing objects in continuous cycle from plastic material comprises a step of providing a distributor unit 2, including a plurality of outfeed branches 203 having respective outlets 205, an infeed duct 201 having an inlet 202 and in communication with the outfeed branches 203 through a distribution zone 204. The method comprises a step of receiving, in the inlet 202, a pressurized flow of molten plastic from an extruder unit 101, where the extruder unit preferably comprises an extruder 101A and a volumetric pump 101B.

The method comprises a step of providing a metering unit 3.

In an example, the step of providing the metering unit 3 comprises the following sub-steps:

placing an outlet valve system including a plurality of pushers 302A, downstream of the plurality of partition elements 303, each pusher 302A being located in a second branch 203B of the respective outfeed branch 203;

placing a plurality of secondary partition elements 303B, downstream of the plurality of valves relative to a feed direction of the plastic from the inlet 202 to the outlets 205, in a corresponding plurality of secondary legs 207 perpendicular to a first branch 203A of the respective outfeed branch 203; the method comprises a step of feeding the flow of molten plastic from the infeed duct 201 to the distribution zone 204 and a step of distributing, that is, dividing, the flow of molten plastic, from the distribution zone 204 to the plurality of outfeed branches 203; in the meantime, each secondary partition element 303B moves to an upper limit position X1, that is, to the position where the internal volume of the distributor unit 2 is in the expanded configuration, that is, in the maximum volume configuration, for example, moved by an actuator 304. When a secondary partition element 303B of an outfeed branch 203 reaches its upper limit position X1, the control unit 5 opens the respective pusher 302A, which moves to the retracted position to open a passage for the plastic in the second branch 203B. The plastic contained in the internal volume advances in the second branch 203B, while the secondary partition element 303B passes from the upper limit position X1 to a lower limit position X2, where the internal volume is in the contracted, or minimum volume, configuration. When the secondary partition element 303B reaches the lower limit position X2, the control unit closes the pusher 302A, which moves from the retracted position in an extraction direction towards a plurality of advanced positions. In moving in an extraction direction between the plurality of advanced positions, the pusher 302A separates the plastic contained in the second branch 203B from the plastic contained in the first branch 203A by closing the passage for the plastic in the second branch 203B. In moving in the extraction direction, the pusher 302A also pushes the plastic contained in the second branch 203B. That way, the pusher 302A forms a dose. The dose comes out through the respective outlet 205 and is gravity fed into a seat 402 of a female element 401 of a plurality of female elements 401. Thus, as the plastic advances from the inlet 202 to the plurality of outlets 205, it undergoes a first separation (in parallel), performed by the distribution zone 204, and a second separation (in series), performed by the plurality of pushers 302A.

In an example, each pusher 302A includes an outer pusher 302B and an inner pusher 302C, wherein the outer pusher 302B is located externally of the inner pusher 302C (the outer pusher 302B externally surrounds the inner pusher 302C). Preferably, the outer pusher 302B and the inner pusher 302C are mutually movable. The pusher 302A may include an air duct 302D, comprised between outer pusher 302B and inner pusher 302C. The 302D air duct is configured to allow a flow of air to pass through. For example, the outer pusher 302B and the inner pusher 302C can reciprocally move (through an axial translation) to put the air duct 302D into communication with the outlet 205, for example to allow a flow of air to exit through the outlet 205. In the retracted position, the outer pusher 302B and the inner pusher 302C cooperate to interrupt communication of the air duct 302D with the outlet 205. In at least one advanced position of the plurality of advanced positions, the outer pusher 302B and the inner pusher 302C cooperate to put the air duct 302D in communication with the outlet 205, in particular to allow an air flow to exit through the outlet 205. For example, in at least one advanced position of the plurality of advanced positions, the inner pusher 302C is retracted or extracted relatively to the outer pusher 302B to put the air duct 302D in communication with the outlet 205.

Thus, in an advanced position of the plurality of advanced positions of the pusher 302A, the inner pusher 302C moves to a retracted or extracted position with respect to the outer pusher 302B, to open a passage for the airflow from the air duct 302D and the outlet 205. The air flow exits the air duct 302D, so as to detach the dose 20. Subsequently, the dose 20 exits the respective outlet 205 and falls, by gravity, into a seat 402 of a female element 401 of a plurality of female elements 401.

Once each seat 402 has received the respective dose of plastic, the plurality of female elements 401 moves along a longitudinal axis of movement X between a spaced-apart position of non-interference with the respective male element 403, and a close-together position where each of them closes a forming cavity relative to the male element 403. The method comprises a step of compressing a dose, in which each female element 402 and the respective male element 403, by moving closer together, form an object by compression.

In an example, the method comprises a step of placing an additional valve system 301 including a plurality of valves 301, each of the plurality of valves 301 being located in a first branch 203A of the respective outfeed branch 203; the method comprises a step of opening the plurality of valves 301 through a control unit 5. After opening the plurality of valves, the molten plastic advances and accumulates in a working portion of the internal volume of the distributor unit 2, that is, in a portion between the plurality of valves 301 and the plurality of pushers 302A; in the meantime, each secondary partition element 303B moves to an upper limit position X1, that is, to the position where the working portion is in the expanded configuration, that is, in the maximum volume configuration, for example, moved by an actuator 304. When a secondary partition element 303B of an outfeed branch 203 reaches its upper limit position X1, the control unit 5 closes the respective valve 301 and opens the respective pusher 302A, which moves to the retracted position to open a passage for the plastic in the second branch 203B. The plastic contained in the working portion of the internal volume advances in the second branch 203B, while the secondary partition element 303B passes from the upper limit position X1 to a lower limit position X2, where the working portion is in the contracted, or minimum volume, configuration. When the secondary partition element 303B reaches the lower limit position X2, the control unit 5 closes the pusher 302A, which separates and pushes to form a dose which is fed out and falls into the seat 402. In this example, while the pusher 302A is being closed, that is, during the movement of the pusher 302A in the extraction direction, the control unit once again opens the valve 301 to allow plastic to accumulate in the working portion again. Thus, as the plastic advances from the inlet 202 to the plurality of outlets 205, it undergoes a first separation (in parallel), performed by the distribution zone 204, a second separation (in series), performed by the plurality of valves 301, and a third separation (in series), performed by the plurality of pushers 302A.

In an example, the method comprises a step of placing an additional valve system 301, including a main valve 301A in the infeed duct 201, and a step of placing a main partition element 303A in the infeed duct downstream of the main valve 301A, in a main leg 206; the method comprises a step of opening the main valve 301 through a control unit 5. After opening the main valve 301A, the molten plastic advances and accumulates in a working portion of the internal volume of the distributor unit 2, that is, in a portion between the main valve 301A and the pushers 302A; in the meantime, the main partition element 303A and the secondary partition elements 303B move to an upper limit position X1, that is, to the position where the working portion is in the expanded configuration, that is, in the maximum volume configuration, for example, the secondary partition elements 303B being moved by the actuators 304 and the main partition element 303A being moved by the main actuator 305. When a secondary partition element 303B of an outfeed branch 203 and the main partition element 303A reach their respective upper limit positions X1, the control unit 5 closes the main valve 301A and opens the respective pusher 302A, which moves to the retracted position to open a passage for the plastic in the second branch 203B. The plastic contained in the working portion of the internal volume advances in the second branch 203B, while the partition elements pass from the upper limit position X1 to a lower limit position X2, where the working portion is in the contracted, or minimum volume, configuration. When the partition elements reach the lower limit position X2, the control unit 5 closes the pusher 302A, which separates and pushes to form a dose which is fed out and falls into the seat 402. In this example, while the pusher 302A is being closed, that is, during the movement of the pusher 302A in the extraction direction, the control unit 5 once again opens the main valve 301A to allow plastic to accumulate in the working portion again. Thus, as the plastic advances from the inlet 202 to the plurality of outlets 205, it undergoes a first separation (in series), performed by the main valve 301A, a second separation (in parallel), performed by the distribution zone 204, and a third separation (in series), performed by the plurality of pushers 302A.

In an embodiment, the method comprises a step of calibrating (or adjusting), to adjust the volume of a dose for one moulding operation of a succession of moulding operations, based on a previous moulding operation or based on that same moulding operation.

Preferably, in one or more embodiments, the pushers 302A are synchronized with each other so that each pusher 302A reaches the closed position of its respective valve simultaneously with the other pushers 302A. That way, the doses fall into the plurality of seats 402 at the same time and the plurality of female elements 401 can move towards the plurality of male elements 402 to act in conjunction therewith to compress the plurality of doses. Alternatively, the pushers 302A are controlled in such a way as to open and close independently of each other, for example to adjust the quantity of plastic fed out.

In an embodiment, following the step of moving and the step of compressing the dose, the method comprises a step of each male element 403, connected to an elastic element 404, making an settling movement along the longitudinal axis of movement X. The settling movement is proportional to a size 406 of a volume of the dose located in the seat of the respective female element 402. More specifically, a distance 405 of the settling movement is proportional to the volume 406 of the dose or to a value derived therefrom. The method comprises a step of detecting, through a distance sensor, the distance 405 of the settling movement and of transmitting the distance 405 to the control unit 5. Preferably, the control unit 5 receives the distance 405 and compares the distance 405 with a predetermined distance, representing an optimal distance, proportional to an optimal volume of the dose. The control unit 5 processes a check parameter, representing the result of the comparison and, based on the check parameter, processes a control parameter. The control unit 5 sends the control parameter to an actuator 304 connected to the secondary partition elements 303B to adjust the upper limit position X1. More specifically, if the value of the distance 405 is less than the predetermined distance, hence the volume of the dose is less than the optimum dose volume, the control unit 5 processes the control parameter so as to modify the upper limit position X1, for example by an adjustment distance 411, to channel a larger quantity of plastic into the secondary leg 207 compared to the previous moulding operation. If the value of the distance 405 is greater than the predetermined distance, hence the volume of the dose is greater than the optimum dose volume, the control unit 5 processes the control parameter so as to modify the upper limit position X1 to channel a smaller quantity of plastic into the secondary leg 207 compared to the previous moulding operation.

Preferably, the method comprises a step of abutting, following the movement of the female element 401 towards a first abutment element 407 connected to a structure 413 of the male element 403 through a first elastic element 404, and a step of abutting a second abutment element 408 connected to the structure of the male element 403 through the second elastic element 408; following the abutment of the second abutment element 408, a punch 412 of the male element 403 makes an settling movement along the longitudinal axis of movement X of the distance 405.

In an embodiment, the control unit 5 processes the check parameter, where the check parameter represents a difference between a volume or a mass of one dose feeding out from the outfeed branch and a reference value for the volume or mass of the dose, and the method comprises a step of measuring with a sensor the volume or the mass of the dose fed out. Next, based on the check parameter, the control unit 5 processes the control parameter for the actuators.

In another example, the control unit 5 processes the control parameter based on a flow parameter, that is, a parameter representing a flow rate of the plastic in the infeed duct. In another example, the control unit 5 processes the control parameter based on an imbalance parameter representing an imbalance between the flow rates of the plastic in the outfeed branches 203 of the plurality of outfeed branches and drives the actuators of the partition elements based on the imbalance parameter.

Preferably, the control unit 5 sends the control parameter to the extruder 101A or to the volumetric pump 101B to adjust the flow of plastic being fed into the infeed duct 201.

The following paragraphs, listed in alphanumeric order for reference, are non-limiting example modes of describing this invention.

A. An apparatus (1) for producing objects in continuous cycle from plastic material, comprising:
- a distributor unit (2), including
  - an infeed duct (201), having an inlet (202) configured to receive a continuous pressurized flow of molten plastic from an extruder unit, and a plurality of outfeed branches (203) in fluid communication with the infeed duct (201) through a distribution zone (204), each outfeed branch (203) having an outlet (205), the distributor unit (2) defining an internal volume between the inlet (202) and the outlets (205);
- a forming station (4) for forming a plurality of objects by compression moulding, including
  - a plurality of female elements (401), positionable at the plurality of outfeed branches (203) of the distributor unit (2) and defining a corresponding plurality of seats (402),
  - a plurality of male elements (403), acting in conjunction with the plurality of female elements (401) to delimit a corresponding plurality of forming cavities to form a plurality of objects from plastic material by compression;
- a metering unit (3), configured to make a plurality of doses simultaneously from the continuous flow of plastic, so as to feed each female element (401) of the plurality of female elements with a respective dose of the plurality of doses, wherein the metering unit (3) includes an outlet valve system (302) having a plurality of outlet valves, each outlet valve being positioned in a respective outfeed branch (203) and being switchable between an open configuration and a closed configuration.

A1. The apparatus according to paragraph A, wherein the metering unit (3) includes the following operating configurations:
- a charging configuration, wherein the outlet valve system (302) is in the closed configuration to interrupt a flow of plastic feeding out from the distributor unit (2);
- a discharging configuration, wherein the outlet valve system (302) is in the open configuration to allow plastic to be discharged from the internal volume of the distributor unit (2);
- a control unit (5), configured to switch the metering unit (3) from the charging configuration to the discharging configuration and vice versa.

A1.1. The apparatus according to paragraph A1, wherein the metering unit (3) includes a plurality of partition elements (303, 303A, 303B), disposed upstream of the outlet valve system (302), each of the plurality of partition elements (303, 303A, 303B) being movable between an upper limit position (X1) and a lower limit position (X2) to vary the internal volume of the distributor unit (2), wherein the plurality of partition elements includes a group of partition elements positioned downstream of the infeed duct (201), wherein the partition elements of the plurality of partition elements (303, 303A, 303B) move
- from the upper limit position (X1) to the lower limit position (X2) in the discharging configuration, and
- from the lower limit position (X2) to the upper limit position (X1) in the charging configuration.

A1.1.1. The apparatus according to paragraph A1.1, wherein the metering unit (3) comprises, for at least one of the plurality of partition elements (303, 303A, 303B), an actuator (304, 305), configured to actuate a movement of the respective partition element between the upper limit position (X1) and the lower limit position (X2), the actuators being driven by the control unit.

A1.1.2. The apparatus according to paragraph A1.1 or A1.1.1, wherein the metering unit (3) comprises an additional valve system (301), positioned upstream of the outlet valve system (302) relative to the feed direction of the plastic from the inlet (202) to the outlets (205) and switchable between an open configuration and a closed configuration,
wherein the plurality of partition elements (303, 303A, 303B) is disposed between the additional valve system (301) and the outlet valve system (302), the internal volume including a working portion included between the additional valve system (301) and the outlet valve system (302),
each of the plurality of partition elements (303, 303A, 303B) being movable between the upper limit position (X1) and the lower limit position (X2) to vary the working portion of the internal volume of the distributor unit (2), wherein, when the metering unit (3) is in the charging configuration, the additional valve system (301) is in the open configuration, to allow plastic to accumulate in the working portion of the internal volume of the distributor unit, and wherein, when in the discharging configuration, the additional valve system (301) is in the closed configuration, to allow discharging the plastic from the working portion of the internal volume and feeding out the doses through the outlets (205) to feed the doses to the plurality of seats (402) of the plurality of female elements (401).

A1.1.3. The apparatus according to any one of paragraphs A1.1. to A1.1.2, wherein at least one of the plurality of partition elements (303, 303A, 303B) defines a plurality of secondary partition elements (303B), each partition element of the plurality of secondary partition elements (303B) being located in a respective outfeed branch of the plurality of outfeed branches (203).

A1.1.4. The apparatus according to any one of paragraphs A1.1. to A1.1.3, wherein the plurality of partition elements (303, 303A, 303B) comprises a main partition element (303A) located in the infeed duct (201) of the distributor unit (2).

A1.1.5. The apparatus according to any one of paragraphs A1.1. to A1.1.4, wherein the upper limit position (X1) of at least one of the plurality of partition elements (303, 303A, 303B) is adjustable so as to vary the maximum quantity of plastic containable in the working portion of the internal volume.

A1.1.5.1. The apparatus according to paragraph A1.1.5, wherein, for each outfeed branch, the control unit is programmed to receive a check parameter and to adjust the upper limit position (X1) of at least one partition element of the plurality of partition elements (303, 303A, 303B) according to the check parameter, the check parameter representing a difference between a volume or a mass of one dose feeding out from the outfeed branch and a reference value for the volume or mass of the dose.

A1.1.5.1.1. The apparatus according to paragraph A1.1.5.1, wherein each of the plurality of female elements (401) is movable along a longitudinal axis of movement (X) between a spaced-apart position of non-interference with the respective male element of the plurality of male elements (403), and a close-together position where it closes a forming cavity, acting in conjunction with the respective male element (403) to compress a dose, and wherein each male element (403) is connected to an elastic element (404) to be able to make an settling movement along the longitudinal axis of movement (X), reacting to the compression of the dose at the closed position of the forming cavity, and wherein the check parameter is derived as a function of the settling movement.

A1.1.5.2. The apparatus according to paragraph A1.1.5, wherein the control unit is programmed to receive, for each outfeed branch, a flow parameter and to adjust the upper limit position (X1) of at least one of the plurality of partition elements (303, 303A, 303B) according to the flow parameter, wherein the apparatus comprises a flow sensor, configured to measure a flow parameter, representing a flow rate of the plastic flowing in the outfeed branches, and wherein the control unit is connected to the sensor to receive the flow parameter.

A1.2. The apparatus according to any one of paragraphs A1.1 to A1.1.5, comprising a sensor system including a plurality of sensors, each of the plurality of sensors being configured for detecting, in real time, a flow parameter correlated with a flow rate of the plastic in each outfeed branch (203), wherein the control unit (5) is connected to the sensor system and to the outlet valve system (302) to drive the outlet valves (302) as a function of the flow parameter.

A1.2.1. The apparatus according to paragraph A1.2, wherein the flow parameter represents a length of a stretch of plastic extruded through each outlet (205) and disposed outside the distributor unit (2).

A2. The apparatus according to any one of paragraphs A to A1.1.5, wherein the outlet valve system (302) comprises a plurality of pushers (302A), each pusher (302A) being located at a respective outfeed branch (203) and being movable reciprocally between a retracted position of non-interference with a flow of plastic in the respective outfeed branch (203), and a plurality of advanced positions where it closes the respective outfeed branch (203), and wherein the pusher (302A) is configured to push the respective dose through the outlet (205), by moving in an extraction direction between the advanced positions so as to keep the respective outlet valve closed.

A3. The apparatus according to any one of paragraphs A to A1.1.5, wherein the outlet valve system (302) comprises a plurality of cutting devices, each cutting device being located at an outlet (205) and being switchable between an open configuration, to allow the plastic to be fed out from the outlet (205), and a closed configuration, in which it is configured to close the outlet (205) and thus to separate a quantity of plastic forming the corresponding dose.

A3.1. The apparatus according to paragraph A3, wherein each cutting device comprises a first knife and a second knife, the first knife and the second knife each including a first blade and a second blade, positioned on opposite sides of the respective knife with respect to a direction of movement of the knife, the first knife and the second knife being juxtaposed with each other along the direction of movement, wherein the first and the second knife are movable relative to each other to exchange positions between the open position and the further open position by way of the closed position in moving from the open position to the further open position.

A3.1.1. The apparatus according to paragraph A3.1, wherein at the closed position of the first and the second knife, the first and the second knife are configured to act in conjunction to cut the dose at the outlet.

B. A method for producing objects in continuous cycle from plastic material, comprising the following steps:
providing a distributor unit (2), including a plurality of outfeed branches (203) having respective outlets (205), an infeed duct (201) having an inlet (202) and in communication with the outfeed branches (203) through a distribution zone (204), the distributor unit (2) defining an internal volume between the inlet (202) and the outlets (205);
receiving from an extruder unit a flow of molten plastic at the inlet (202) of the infeed duct (201);
distributing the flow of plastic through the distribution zone (204) to the plurality of outfeed branches (203);
providing a metering unit (3);
forming, with the metering unit (3), a plurality of doses from the continuous flow of plastic, through an outlet valve system (302) having a plurality of outlet valves, each outlet valve being positioned in a respective outfeed branch (203) and being switchable between an open position and a closed position;
feeding each of the plurality of female elements (401), positioned at the plurality of outfeed branches (203), simultaneously, with a respective dose of the plurality of doses;
compressing the doses between the plurality of female elements (401) and a corresponding plurality of male elements (403) to form a plurality of objects of plastic material.

B1. The method according to paragraph B, comprising the following steps, performed by a control unit (5):
switching the metering unit (3) from a charging configuration, which allows interrupting the flow of plastic feeding out from the distributor unit (2), and a discharging configuration, which allows discharging plastic from the internal volume and feeding doses of plastic out through the outlets (205) to feed the doses to the plurality of seats (402) of the plurality of female elements (401);
switching the metering unit (3) from the discharging configuration to the charging configuration, wherein the outlet valve system is in the closed configuration when the metering unit (3) is in the charging configuration, and in the open configuration when the metering unit (3) is in the discharging configuration.

B1.1. The method according to paragraph B1, comprising the steps of
providing a plurality of partition elements (303, 303A, 303B) of the metering unit (3), each of the plurality of partition elements (303, 303A, 303B) being movable between an upper limit position (X1) and a lower limit position (X2) to vary the internal volume of the distributor unit (2), wherein the plurality of partition elements (303, 303A, 303B) includes a group of partition elements positioned downstream of the infeed duct (201),
moving the at least one partition element of the plurality of partition elements (303, 303A, 303B) between the upper limit position (X1) and the lower limit position (X2), preferably by means of an actuator (304, 305), wherein the partition elements of the plurality of partition elements (303, 303A, 303B) move
from the upper limit position (X1) to the lower limit position (X2) in the discharging configuration, and
from the lower limit position (X2) to the upper limit position (X1) in the charging configuration.

B1.1.1. The method according to paragraph B1.1, wherein the metering unit (3) includes an additional valve system (301), positioned upstream of the outlet valve system (302), relative to a feed direction of the plastic from the inlet (202) to the outlets (205), and wherein a working portion of the internal volume, included between the additional valve system (301) and the outlet valve system (302), is variable from a contracted configuration, where it has its minimum volume, to an expanded configuration, where it has its maximum volume,
the method further comprising the following steps, performed by the control unit (5):
closing the outlet valve system (302) and opening the additional valve system (301), with the metering unit (3) in the charging configuration,
closing the additional valve system (301) and opening the outlet valve system (302), with the metering unit (3) in the discharging configuration.

B1.1.2. The method according to any one of paragraphs B1.1 to B1.1.1, wherein the upper limit position (X1) of at least one of the plurality of partition elements (303, 303A, 303B) is adjusted by the control unit to vary the maximum quantity of plastic containable in the working portion of the internal volume.

B1.1.2.1. The method according to paragraph B1.1.2, wherein the control unit (preferably for each outfeed branch) receives a check parameter and adjusts the upper limit position (X1) of at least one partition element of the plurality of partition elements (303, 303A, 303B) according to the check parameter, the check parameter representing a difference between a volume or a mass of one dose feeding out from the outfeed branch and a reference value for the volume or mass of the dose.

B1.1.2.1.1. The method according to paragraph B1.1.2.1, wherein each of the plurality of female elements (401) is movable along a longitudinal axis of movement (X) between a spaced-apart position of non-interference with the respective male element of the plurality of male elements (403), and a close-together position where it closes a forming cavity, acting in conjunction with the respective male element (403) to compress a dose, and wherein each male element (403) is connected to an elastic element (404) to be able to make an settling movement along the longitudinal axis of movement (X), reacting to the compression of the dose at the closed position of the forming cavity, and wherein the control unit derives the check parameter as a function of the settling movement.

B1.1.2.2. The method according to paragraph B1.1.2, wherein the control unit (preferably for each outfeed branch) receives a flow parameter representing a flow rate of the plastic flowing in the apparatus (preferably in the outfeed branches), and adjusts the upper limit position (X1) of at least one of the plurality of partition elements (303, 303A, 303B) according to the flow parameter.

B1.2. The method according to any one of paragraphs B1.1 to B1.1.2.2, comprising a step of preparation of a sensor system including a plurality of sensors, each of the plurality of sensors detecting, in real time, a flow parameter correlated with a flow rate of the plastic in each outfeed branch (203), wherein the control unit (5) is connected to the sensor system and to the outlet valve system (302) to drive the outlet valves (302) as a function of the flow parameter.

B1.2.1. The method according to paragraph B1.2, wherein the flow parameter represents a length of a stretch of plastic extruded through each outlet (205) and disposed outside the distributor unit (2).

B2. The method according to any one of paragraphs B to B1.2.1, wherein the outlet valve system (302) includes a plurality of pushers (302A), located in the plurality of outfeed branches (203), and wherein each pusher (302A) moves reciprocally between a retracted position, where it open the respective outfeed branch (203), and a plurality of advanced positions where it closes the respective outfeed branch (203), so that the pusher (302A), by moving in an extraction direction between the advanced positions, pushes the respective dose through the outlet (205) while keeping the respective outlet valve closed.

B3. The method according to any one of paragraphs B to B2, wherein the outlet valve system (302) includes a plurality of cutting devices, each cutting device being located at an outlet (205), the method comprising the following steps:
opening each cutting device to allow plastic to be fed out from the outlet (205), and
closing each cutting device to close the outlet (205) and thus to separate a quantity of plastic forming the corresponding dose.

B3.1. The method according to paragraph B3, wherein each cutting device is configured to occlude the respective outlet, thus defining a shutter.

B3.1.1. The method according to paragraph B3.1, wherein each cutting device is connected to the control unit, which controls a working cycle, determining a closed time (during which the cutting device/shutter is closed) and an open time (during which the cutting device/shutter is open).

B3.1.1.1. The method according to paragraph B3.1.1, wherein the control unit manages the cutting devices/shutters in differentiated mode so as to be able to set differentiated working cycles for different cutting devices/shutters.

B3.2. The method according to any one of paragraphs from B3 to B3.1.1.1, comprising the following steps:
providing a sensor system including a plurality of sensors;
through each of the plurality of sensors, detecting, in real time, a flow parameter correlated with a flow rate of the plastic in each outfeed branch (203), the flow parameter representing a length of a stretch of plastic extruded through each outlet (205) and disposed outside the distributor unit (2);
through a control unit (5) connected to the cutting devices and to the sensor system, receiving the flow parameter, closing the cutting devices and opening the cutting devices as a function of the flow parameter.

B3.3. The method according to any one of paragraphs B3 to B3.2, wherein each cutting device comprises a first knife and a second knife, the first knife and the second knife each including a first blade and a second blade, positioned on opposite sides of the respective knife with respect to a direction of movement of the knife, the first knife and the second knife being juxtaposed with each other along the direction of movement, the method comprising a step of closing during a step of opening and further opening the first and the second knife, which exchange positions and act in conjunction to cut the dose at the outlet.

The invention claimed is:
1. An apparatus for producing objects in continuous cycle from plastic material, comprising:
a distributor unit, including an infeed duct, having an inlet configured to receive a continuous pressurized flow of molten plastic from an extruder unit, and a plurality of outfeed branches in fluid communication with the infeed duct through a distribution zone, each outfeed branch having an outlet, the distributor unit defining an internal volume between the inlet and the outlets so that the molten plastic can flow from the inlet to the outlets in a feed direction;

a forming station for forming a plurality of objects by compression moulding, including a plurality of female elements, positionable at the plurality of outfeed branches of the distributor unit and defining a corresponding plurality of seats, a plurality of male elements, acting in conjunction with the plurality of female elements to delimit a corresponding plurality of forming cavities to form the plurality of objects from plastic material by compression;

a metering unit, including an outlet valve system having a plurality of outlet valves, each outlet valve being positioned in a respective outfeed branch;

an additional valve system, positioned upstream of the outlet valve system relative to the feed direction, wherein the outlet valve system and the additional valve system are each switchable between an open configuration and a closed configuration, a portion of the internal volume between the outlet valve system and the additional valve system constituting a working portion of the internal volume, a plurality of partition elements, disposed between the additional valve system and the outlet valve system, each of the plurality of partition elements being movable between an upper limit position and a lower limit position to vary the working portion of the internal volume of the distributor unit, wherein the metering unit includes:

a charging configuration, in which the outlet valve system is in the closed configuration and the additional valve system is in the open configuration, to allow plastic to accumulate in the working portion of the internal volume, a discharging configuration, in which the additional valve system is in the closed configuration and the outlet valve system is in the open configuration, to allow plastic to be discharged from the working portion of the internal volume;

a control unit, configured to switch the metering unit from the charging configuration to the discharging configuration, with the plurality of partition elements positioned at the lower limit position, and from the discharging configuration to the charging configuration, with the plurality of partition elements positioned at the upper limit position, so as to make a plurality of doses of plastic, the doses being fed to the plurality of seats.

2. The apparatus according to claim 1, wherein, for at least one of the plurality of partition elements, the metering unit comprises an actuator, configured to actuate a movement of the respective partition element between the upper limit position and the lower limit position.

3. The apparatus according to claim 1, wherein the plurality of partition elements comprises a group of partition elements including a plurality of secondary partition elements, each partition element of the plurality of secondary partition elements being located in a respective outfeed branch of the plurality of outfeed branches.

4. The apparatus according to claim 3, wherein the plurality of partition elements comprises a main partition element located in the infeed duct of the distributor unit.

5. The apparatus according to claim 3, wherein each of the secondary partition elements comprises an actuator and wherein the upper limit position of at least one of the plurality of partition elements is adjustable so as to vary the maximum quantity of plastic containable in the working portion of the internal volume.

6. The apparatus according to claim 1, wherein the outlet valve system comprises a plurality of pushers, each pusher being located at a respective outfeed branch and being movable reciprocally between a retracted position of non-interference with a flow of plastic in the respective outfeed branch, and a plurality of advanced positions where it closes the respective outfeed branch, and wherein the pusher is configured to push the respective dose through the outlet, by moving in an extraction direction between the advanced positions so as to keep the respective outlet valve closed.

7. The apparatus according to claim 6, wherein:

each pusher of the plurality of pushers includes an outer pusher and an inner pusher mutually movable, the outer pusher externally surrounding the inner pusher, and an air duct, comprised between the outer pusher and the inner pusher and configured to allow a flow air to pass through;

in the retracted position, the outer pusher and the inner pusher cooperate to interrupt a communication of the air duct with the outlet, and in at least one advanced position of the plurality of advanced positions, the inter pusher is retracted relatively to the outer pusher to put the air duct in communication with the outlet, to allow an air flow to exit through the outlet.

8. The apparatus according to claim 1, wherein the control unit is programmed, for one moulding operation of a succession of moulding operations, to control the upper limit position of at least one of the plurality of partition elements, based on a check parameter representing a previous moulding operation.

9. The apparatus according to claim 8, wherein each of the plurality of female elements is movable along a longitudinal axis of movement between a spaced-apart position of non-interference with the respective male element of the plurality of male elements, and a close-together position where it closes a forming cavity, acting in conjunction with the respective male element to compress the dose, and wherein each male element is connected to an elastic element to be able to make an settling movement along the longitudinal axis of movement, reacting to the compression of the dose at the closed position of the forming cavity, and wherein the control unit is programmed to derive the check parameter as a function of the settling movement.

10. The apparatus according to claim 1, wherein the working portion of the internal volume is variable from a contracted configuration, where it has its minimum volume, to an expanded configuration, where it has its maximum volume, and wherein the difference between the maximum volume and the minimum volume of the working portion is equal to the volume of one dose multiplied by the number of outfeed branches.

11. The apparatus according to claim 1, wherein the additional valve system comprises a plurality of valves, each of the plurality of valves being located in a respective outfeed branch of the plurality of outfeed branches.

* * * * *